US010877707B2

(12) United States Patent
Kim et al.

(10) Patent No.: US 10,877,707 B2
(45) Date of Patent: Dec. 29, 2020

(54) METHOD FOR PROVIDING GIFT VOUCHER ISSUING SERVICE AND GIFT VOUCHER ISSUING SERVICE SYSTEM CAPABLE OF PERFORMING METHOD

(71) Applicants: Jin Gon Kim, Yeoju-si (KR); Jun Seo Kim, Yeoju-si (KR); O2WORKS CO., LTD., Yeoju-si (KR); HANASIS CO., LTD., Suwon-si (KR)

(72) Inventors: Jin Gon Kim, Yeoju-si (KR); Jun Seo Kim, Yeoju-si (KR)

(73) Assignees: Jin Gon Kim, Yeoju-si (KR); Jun Seo Kim, Yeoju-si (KR); O2WORKS CO., LTD., Yeoju-si (KR); HANASIS CO., LTD., Suwon-si (KR)

( * ) Notice: Subject to any disclaimer, the term of this patent is extended or adjusted under 35 U.S.C. 154(b) by 0 days.

(21) Appl. No.: 16/635,543

(22) PCT Filed: Jul. 27, 2018

(86) PCT No.: PCT/KR2018/008585
§ 371 (c)(1),
(2) Date: Jan. 30, 2020

(87) PCT Pub. No.: WO2019/027193
PCT Pub. Date: Feb. 7, 2019

(65) Prior Publication Data
US 2020/0167106 A1  May 28, 2020

(30) Foreign Application Priority Data

Jul. 31, 2017  (KR) ........................ 10-2017-0096938

(51) Int. Cl.
*G06K 15/00*  (2006.01)
*G06F 3/12*  (2006.01)
(Continued)

(52) U.S. Cl.
CPC .......... *G06F 3/1243* (2013.01); *G06F 3/1205* (2013.01); *G06F 3/1285* (2013.01);
(Continued)

(58) Field of Classification Search
CPC .... G06F 3/1243; G06F 3/1205; G06F 3/1285; G06Q 20/4012; G06Q 20/4014; G06Q 30/0236
See application file for complete search history.

(56) References Cited

U.S. PATENT DOCUMENTS

| 2004/0210482 A1* | 10/2004 | Keneaki ................. G06Q 30/02 705/14.26 |
| 2007/0075134 A1* | 4/2007 | Perlow ................... G06Q 30/06 235/380 |

(Continued)

FOREIGN PATENT DOCUMENTS

| JP | 15085598 | 3/2003 |
| KR | 1020020011209 | 2/2002 |

(Continued)

*Primary Examiner* — Moustapha Diaby

(57) ABSTRACT

A method of providing a gift voucher issuing service includes receiving, by an operation server, gift voucher issuance information from a computing device, generating, by the operation server, a reception date of the gift voucher issuance information as a gift voucher issuance date, generating, by the operation server, a use registration number on the basis of the gift voucher issuance information, generating, by the operation server, gift voucher printing information including the gift voucher issuance information, the gift voucher issuance date, and the use registration number and transmitting the gift voucher printing information to the computing device, receiving, by a printing apparatus, the gift voucher printing information transmitted from the computing device and ticketing an invalid gift voucher by printing the gift voucher issuance information, the gift voucher issuance date, and the use registration number on a (Continued)

gift voucher sheet on which a printing paper management number for managing a gift voucher sheet is printed in advance, transmitting, by the computing device, the printing paper management number and the use registration number to the operation server, and converting the invalid gift voucher into a valid gift voucher as the operation server registers the printing paper management number and the use registration number as a pair.

18 Claims, 15 Drawing Sheets

(51) Int. Cl.
*G06Q 20/40* (2012.01)
*G06Q 30/02* (2012.01)

(52) U.S. Cl.
CPC ..... *G06Q 20/4012* (2013.01); *G06Q 20/4014* (2013.01); *G06Q 30/0236* (2013.01)

(56) References Cited

U.S. PATENT DOCUMENTS

| | | | |
|---|---|---|---|
| 2008/0257958 A1* | 10/2008 | Rothwell | G07G 1/12 235/380 |
| 2011/0288948 A1* | 11/2011 | Spall | G06Q 30/0601 705/26.1 |
| 2016/0019749 A1* | 1/2016 | Irwin, Jr. | G06Q 20/32 463/17 |
| 2017/0078516 A1* | 3/2017 | Ishizaki | G06Q 30/0283 |
| 2017/0228965 A1* | 8/2017 | Irwin, Jr. | B42D 25/285 |

FOREIGN PATENT DOCUMENTS

| | | |
|---|---|---|
| KR | 1020020012701 | 2/2002 |
| KR | 1020030084000 | 11/2003 |
| KR | 1020030094890 | 12/2003 |
| KR | 1020070119334 | 12/2007 |
| KR | 1020120071694 | 7/2012 |
| KR | 1020140103886 | 8/2014 |
| KR | 1020150050792 | 5/2015 |

* cited by examiner

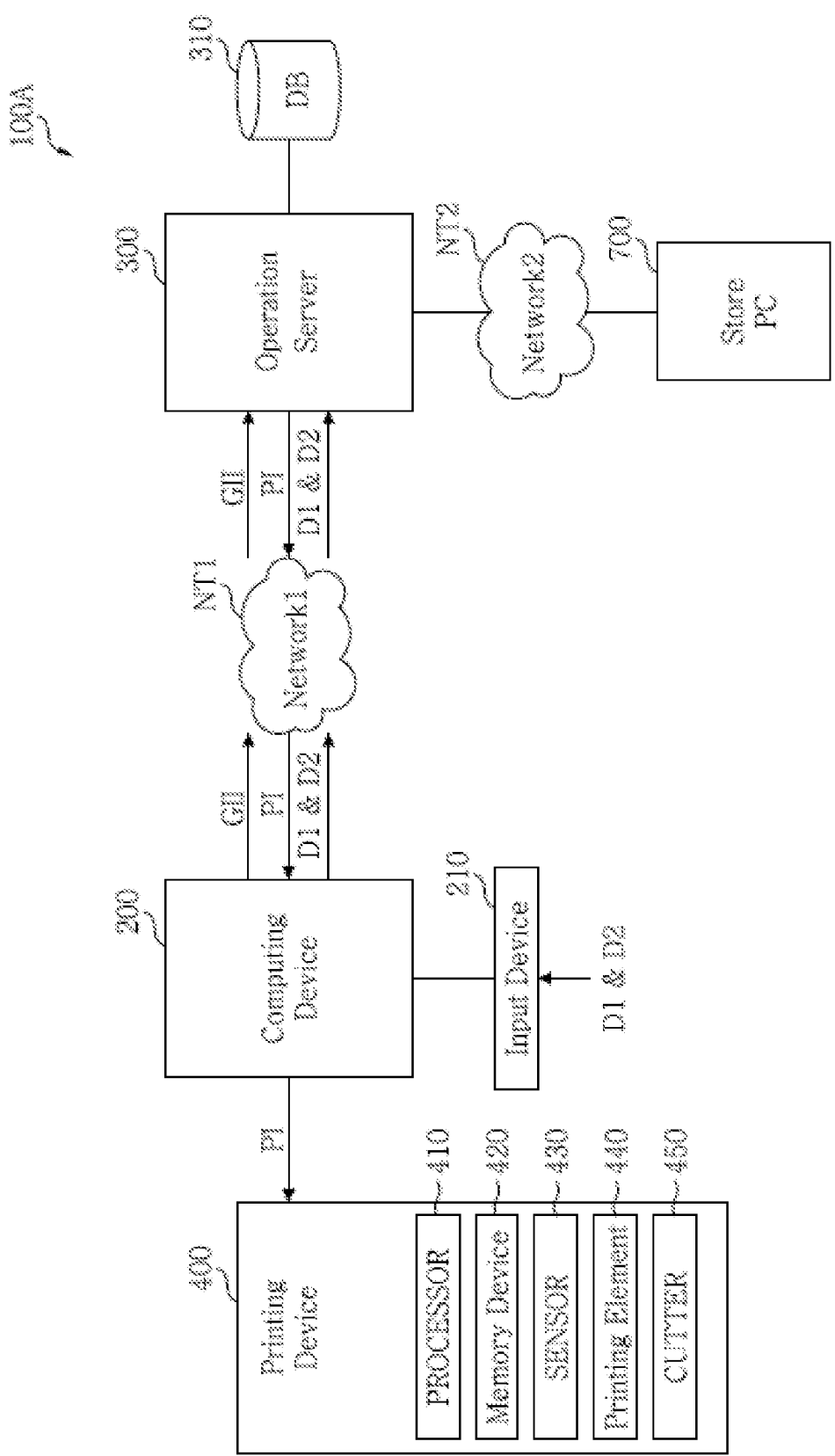

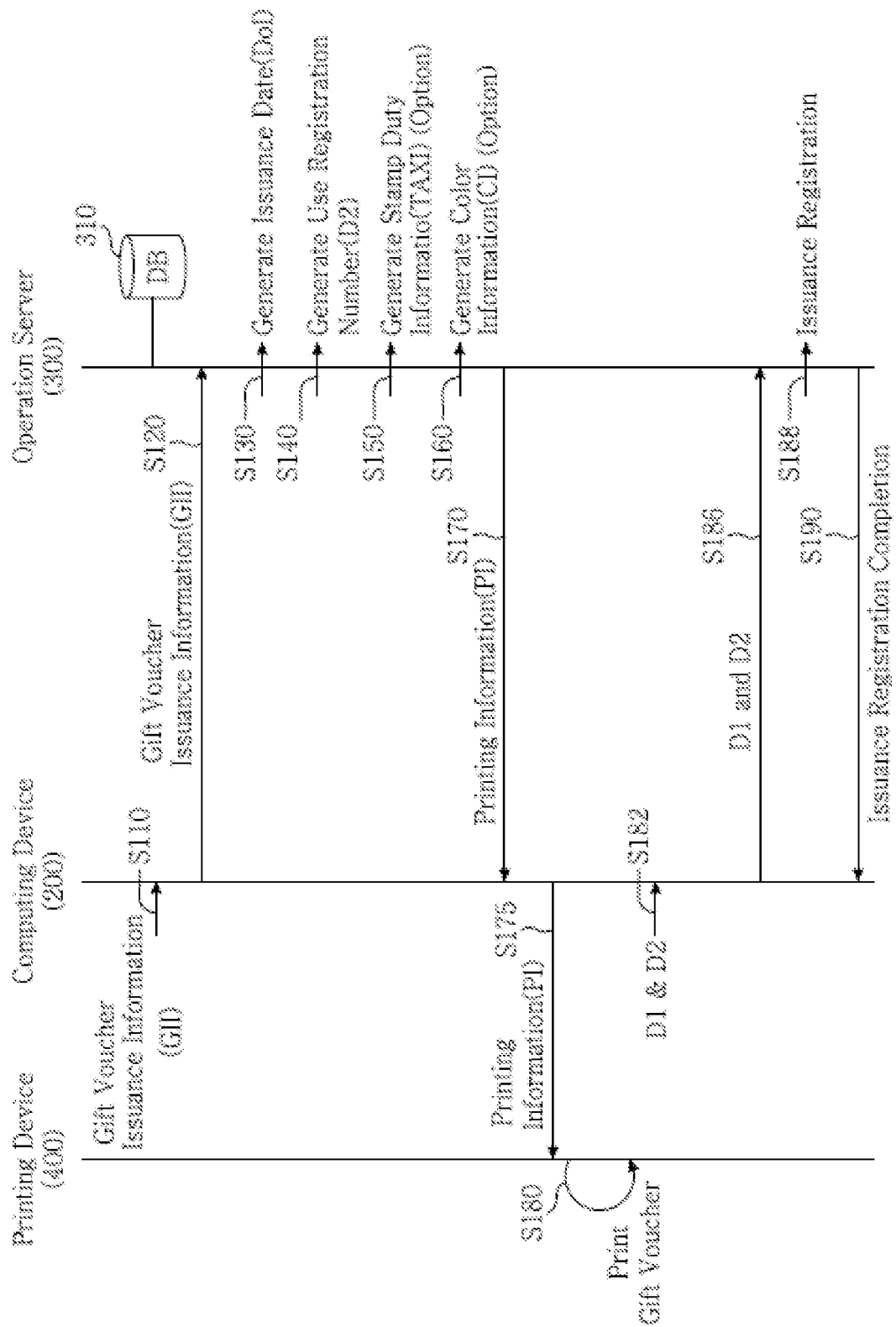

FIG. 3

TABLE1

| Use Registration Number (D2) | Printing Paper Management Number (D1) | Gift Voucher Issuer (GCI) | Face Value (VAL) | Issuance Date (DoI) | Stamp Duty Information (TAXI) | Color Information (CI) |
|---|---|---|---|---|---|---|
| D2-1 | - | A Company | 100,000 | 2017.7.30 | TAX1 | CI1 |
| D2-2 | - | A Company | 100,000 | 2017.7.30 | TAX1 | CI1 |
| *** | *** | *** | *** | *** | *** | *** |
| D2-7 | - | A Company | 50,000 | 2017.7.30 | TAX2 | CI2 |

  Issuance Registration

TABLE1

| Use Registration Number (D2) | Printing Paper Management Number (D1) | Gift Voucher Issuer (GCI) | Face Value (VAL) | Issuance Date (DoI) | Stamp Duty Information (TAXI) | Color Information (CI) |
|---|---|---|---|---|---|---|
| D2-1 | D1-1 | A Company | 100,000 | 2017.7.30 | TAX1 | CI1 |
| D2-2 | D1-2 | A Company | 100,000 | 2017.7.30 | TAX1 | CI1 |
| *** | *** | *** | *** | *** | *** | *** |
| D2-7 | D1-7 | A Company | 50,000 | 2017.7.30 | TAX2 | CI2 |

FIG. 4

| Gift Voucher Issuer | Face Value | | Number of Issuances | TPL |
|---|---|---|---|---|
| 201 | 203 | | 205 | |
| A Company | 100,000 | X | 2 | |
| 202 | 207 | | 209 | |
| A Company | 50,000 | X | 2 | |

Transmission — 211

FIG. 8

TABLE2

| Payment Authentication Number(D4) | Printing Paper Management Number(D1) | FLAG | Gift Voucher Issuer (GCI) | Face Value (VAL) | Issuance Date (DoI) | Stamp Duty Information (TAXD) | Color Information (CI) | Use Registration Number (D2) |
|---|---|---|---|---|---|---|---|---|
| D4-1 | D1-1 | 0→1 | A Company | 100,000 | 2017.7.30 | TAX1 | CI1 | D2-1 |
| D4-2 | D1-2 | 0 | A Company | 100,000 | 2017.7.30 | TAX1 | CI1 | D2-2 |
| ... | ... | ... | ... | ... | ... | ... | ... | ... |
| D4-7 | D1-7 | 0 | A Company | 50,000 | 2017.7.30 | TAX2 | CI2 | D2-7 |

| COATING PRESERVATIVE DYE | ~909 |
| THERMAL DEVELOPED COLOR DYE | ~907 |
| INVISIBLE FLUORESCENCE COLORED THREADS | ~905 |
| PRINTING STENCIL PAPER | ~903 |
| INVISIBLE FLUORESCENCE COLORED THREADS | ~901 |

FIG. 15

TABLE3

| Issuing Bank Management Number(IMB) | Face Value (VAL) | Issuance Date (CDoI) | Check Number (CNB) | Check Issuance Registration | Color Information (CI) |
|---|---|---|---|---|---|
| IM1 | 100,000 | 2017.7.31 | - | O | CI3 |
| IM1 | 100,000 | 2017.7.31 | - | O | CI3 |
| ... | ... | ... | ... | ... | ... |

⇩ Check Issuance Registration ⇨

TABLE3

| Issuing Bank Management Number(IMB) | Face Value (VAL) | Issuance Date (CDoI) | Check Number (CNB) | Check Issuance Registration | Color Information (CI) |
|---|---|---|---|---|---|
| IM1 | 100,000 | 2017.7.31 | CNB1 | O→1 | CI3 |
| IM1 | 100,000 | 2017.7.31 | CNB2 | O→1 | CI3 |
| ... | ... | ... | ... | ... | ... |

METHOD FOR PROVIDING GIFT VOUCHER ISSUING SERVICE AND GIFT VOUCHER ISSUING SERVICE SYSTEM CAPABLE OF PERFORMING METHOD

TECHNICAL FIELD

Embodiments of the present invention relate to a method of providing a gift voucher issuing service, and particularly to a method of providing a gift voucher issuing service in which an invalid gift voucher can be printed by printing gift voucher information to be issued on a gift voucher sheet on which a printing paper management number is printed in advance and the invalid gift voucher can be converted into a valid gift voucher through a registration process, and a gift voucher issuing service system capable of performing the method.

BACKGROUND ART

A gift voucher is a kind of marketable securities which can be exchanged for goods corresponding to an amount on a face of a bill or goods written on the face of a bill. A typical method of purchasing a gift voucher is that a gift voucher consumer directly visits a gift voucher issuance agency or sales agency to purchase the gift voucher.

Since a gift voucher issuance agency (or sales agency) that sells gift vouchers of a first department store sells only gift vouchers issued by the first department store, gift vouchers of a second department store different from the first department store cannot be purchased at the gift voucher issuance agency (or sales agency). Conventional paper gift vouchers are made through a process of simultaneously printing information necessary for the production of each of a plurality of gift vouchers on gift voucher whole paper and cutting each of the plurality of gift vouchers into a single sheet. In this case, each of the plurality of gift vouchers has the same face value as a gift voucher of the same company.

Technical Problem

An object of the present inventive concepts is to provide a method of providing marketable securities issuing service which can immediately print (issue, ticket, or output) afterward printing information (for example, a plurality of issuers, a plurality of face values, and/or use registration numbers) desired by marketable securities buyers in the afterward printing areas of marketable securities (for example, paper gift vouchers or cashier's checks) sheets including beforehand printing information printed in the beforehand printing areas using a printing apparatus in a place equipped with a computing device and the printing apparatus, issue invalid marketable securities as a result of the printing, and convert the invalid marketable securities into valid marketable securities using the beforehand printing information and the afterward printing information, and a marketable securities issuing service system used in the method of providing marketable securities issuing service.

Technical Solution

An exemplary embodiment of the present inventive concepts is directed to a method of providing a gift voucher issuing service, including receiving, by an operation server, gift voucher issuance information from a computing device, generating, by the operation server, a reception date of the gift voucher issuance information as a gift voucher issuance date, generating, by the operation server, a use registration number on the basis of the gift voucher issuance information, generating, by the operation server, gift voucher printing information including the gift voucher issuance information, the gift voucher issuance date, and the use registration number, transmitting the gift voucher printing information to the computing device, receiving, by a printing apparatus, the gift voucher printing information from the computing device, ticketing an invalid gift voucher by printing the gift voucher issuance information, the gift voucher issuance date, and the use registration number on a gift voucher sheet on which a printing paper management number for managing a gift voucher sheet is printed in advance, transmitting, by the computing device, the printing paper management number and the use registration number to the operation server, and converting the invalid gift voucher into a valid gift voucher as the operation server registers the printing paper management number and the use registration number as a pair.

Another exemplary embodiment of the present inventive concepts is directed to a method of providing a gift voucher issuing service, including transmitting, by an operation server, a printing paper management number and a payment authentication number to a server, receiving, by the operation server, gift voucher issuance information from a computing device, generating, by the operation server, a reception date of the gift voucher issuance information as a gift voucher issuance date, generating, by the operation server, a use registration number on the basis of the gift voucher issuance information, generating, by the operation server, gift voucher printing information including the gift voucher issuance information, the gift voucher issuance date, and the use registration number and transmitting the gift voucher printing information to the computing device, receiving, by a printing apparatus, the gift voucher printing information transmitted from the computing device and ticketing an invalid gift voucher by printing the gift voucher issuance information, the gift voucher issuance date, and the use registration number on a gift voucher sheet on which the payment authentication number and the printing paper management number for managing the gift voucher sheet are printed in advance, transmitting, by the computing device, the printing paper management number and the use registration number to the operation server, and converting the invalid gift voucher into a valid gift voucher as the operation server registers the printing paper management number and the use registration number as a pair, in which the payment authentication number printed on the gift voucher sheet in advance is coated with an opaque material not to be visible.

Still another exemplary embodiment of the present inventive concepts is directed to a gift voucher issuing service system, including a printing apparatus, a computing device configured to control an operation of the printing apparatus, and an operation server configured to transmit or receive information to or from the computing device through a communication network. The operation server transmits a first printing paper management number, a second printing paper management number, a first payment authentication number, and a second payment authentication number to a server, receives gift voucher issuance information from a computing device, generates a reception date of the gift voucher issuance information as a gift voucher issuance date, generates a first use registration number and a second use registration number on the basis of the gift voucher issuance information, generates gift voucher printing information including the gift voucher issuance information, the gift voucher issuance date, the first use registration number, and the second use registration number, and transmits the gift voucher printing information to the computing device, the printing apparatus receives the gift voucher printing information transmitted from the computing device, tickets a first invalid gift voucher by printing the gift voucher issuance information, the gift voucher issuance date, and the first use registration number on a first gift voucher sheet on which the first printing paper management number for managing a first gift voucher sheet and the first payment authentication number are printed in advance, and subsequently tickets a second invalid gift voucher by printing the gift voucher issuance information, the gift voucher issuance date, and the second use registration number on a second gift voucher sheet on which the second printing paper management number for managing a second gift voucher sheet and the second payment authentication number are printed in advance, the computing device transmits the second printing paper management number and the second use registration number to the operation server after transmitting the first printing paper management number and the first use registration number to the operation server, the first invalid gift voucher is converted into a first valid gift voucher as the operation server registers the first printing paper management number and the first use registration number as a pair, and the second invalid gift voucher is converted into a second valid gift voucher as the operation server registers the second printing paper management number and the second use registration number as a pair, each of the first payment authentication number printed on the first gift voucher sheet in advance and the second payment authentication number printed on the second gift voucher sheet in advance is coated with an opaque material not to be visible, and the printing apparatus, when the first gift voucher sheet and the second gift voucher sheet are connected, cuts between the first gift voucher sheet and the second gift voucher sheet using a cutter, and tickets each of the first invalid gift voucher and the second invalid gift voucher in sheets.

Advantageous Effects

A method of providing marketable securities issuing service and a marketable securities issuing service system used in the method of providing marketable securities issuing service according to an exemplary embodiment of the present inventive concepts can immediately print (issue, ticket, or output) afterward printing information (for example, a plurality of issuers, a plurality of face values, and/or use registration numbers) desired by marketable securities buyers in the afterward printing areas of marketable securities (for example, paper gift vouchers or cashier's checks) sheets including beforehand printing information printed in the beforehand printing areas using a printing apparatus in a place equipped with a computing device and the printing apparatus.

In the method of providing a service and the service system, invalid marketable securities can be issued as a result of the printing, and the invalid marketable securities can be converted into valid marketable securities by using the beforehand printing information and the afterward printing information.

Since marketable securities sheets are packaged in a roll shape and only beforehand printing information is printed in the beforehand printing area of each of the marketable securities sheets in the method of providing a service and the service system, each of the marketable securities sheets may not have a function as marketable securities. Therefore, security guards are not necessary when the marketable securities packaged in a roll shape are stored or moved.

BRIEF DESCRIPTION OF THE DRAWINGS

FIG. 1 is a schematic block diagram of a gift voucher issuing service system according to embodiments of the present invention;

FIG. 2 is a data flow for describing a method of providing a gift voucher issuance service performed by the gift voucher issuing service system shown in FIG. 1;

FIG. 3 shows information of a first table stored in a database of FIG. 1;

FIG. 4 is a graphical user interface for describing a process of inputting gift voucher issuance information into a program executed in the computing device of FIG. 1;

FIG. 8 shows information included in a second table stored in a database shown in FIG. 7;

FIG. 12 shows a cross-sectional structure of a gift voucher sheet used by the printing apparatus shown in FIGS. 1 and 7;

FIG. 15 is an embodiment of information of a third table stored in a database shown in FIG. 14.

BEST MODE

Figure 5:
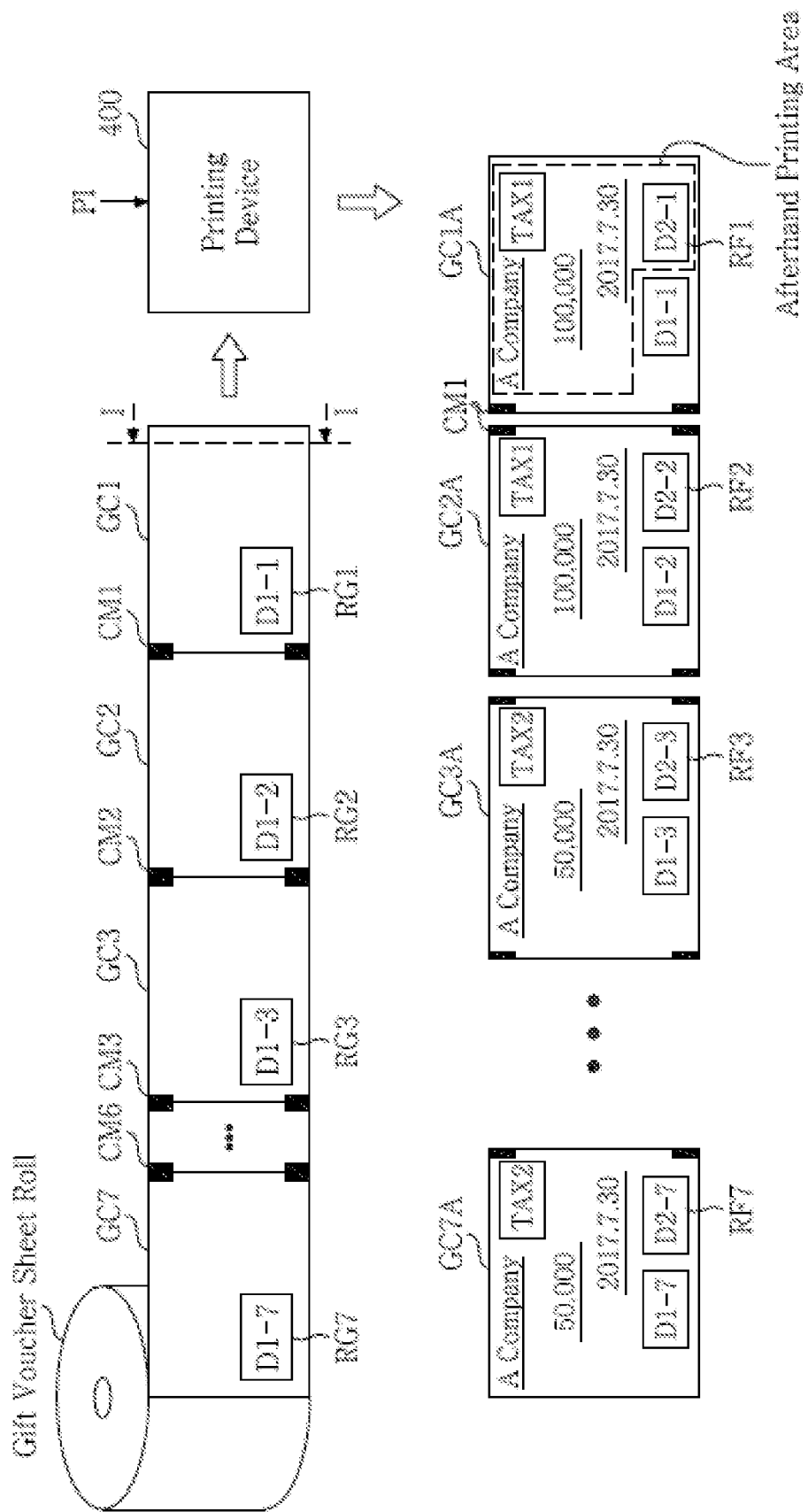
FIG. 5 shows gift vouchers printed on a gift voucher sheet by a printing apparatus of FIG. 1 based on gift voucher printing information according to an embodiment of the present invention.

In the present specification, a gift voucher (a gift voucher, gift card, gift certificate, gift token, or voucher, hereinafter, collectively referred to as a "gift voucher") may refer to an amount gift voucher as a paper gift voucher issued on a sheet (for example, paper).

Since the amount gift voucher refers to a gift voucher with which goods or services corresponding to an amount written in the face of bill of the gift voucher can be provided, the amount gift voucher is understood as a concept of including both a goods gift voucher (that is, a gift voucher with which goods written in the face of bill of the gift voucher can be provided) and a service gift voucher (that is, a gift voucher with which a service written in the face of bill of the gift voucher can be provided).

Information printed on a gift voucher sheet (or gift voucher printing sheet) includes beforehand printing information and afterward printing information. For example, the beforehand printing information is printed in a beforehand printing area of a gift voucher sheet by a first printing apparatus as information that cannot be changed by a gift voucher issuer or gift voucher seller, the afterward printing information is printed in an afterward printing area of the gift voucher sheet by a second printing apparatus as information that can be changed by the gift voucher issuer or the gift voucher seller, and the first printing apparatus and the second printing apparatus may have different printing methods or means.

For example, the beforehand printing information (or pre-printing information) may be printed in the beforehand printing area (or pre-printing area) of a gift voucher sheet by a first printing apparatus installed in the Mint (for example, Korea Mint Corporation) and the afterward printing information (or post-printing information) may be printed in the afterward printing area (or post-printing area) of the gift voucher sheet by a second printing apparatus connected to a computing system to be described in the present specification.

A gift voucher issuer refers to a person (or company) that directly issues a paper gift voucher or includes a person (or company) that issues (or sells) a paper gift voucher on a consignment of the person (or company). A face value may refer to a type of a paper gift voucher. The type of a paper gift voucher may vary depending on a management policy of a gift voucher issuer or a gift voucher seller.

A gift voucher printed (or issued) by the printing apparatus 400 is an invalid gift voucher (that is, a legally or officially ineffective gift voucher) before issuance registration is performed thereon, and the printed (or ticketed) gift voucher is finally converted (activated) into a valid gift voucher (that is, a legally or officially effective gift voucher) after the issuance registration is performed thereon.

Information necessary for issuance registration may be information printed in the beforehand printing area of a gift voucher sheet and information printed in the afterward printing area of the gift voucher sheet. The embodiments shown in FIGS. 1 to 12 relate to issuance of gift vouchers and those in FIGS. 13 to 15 relate to issuance of cashier's checks, but technical concepts of the present invention described herein can be applied to marketable securities (negotiable securities).

FIG. 1 is a schematic block diagram of a gift voucher issuing service system according to embodiments of the present invention. Referring to FIG. 1, a gift voucher issuing (producing, ticketing, or printing) service system 100A includes a computing device 200, an operation server (or control server) 300, and a printing apparatus 400. The gift voucher issuing service system 100A may further include a database 310 and a store PC 700 in addition to the components 200, 300, and 400.

The computing device 200 may be a computer, a personal computer (PC), or a point of sale (POS) system, and may transmit or receive information GII, PI, D1, and D2 to or from the operation server 300 through a first communication network NT1, control an operation of the printing apparatus 400, and transmit gift voucher printing information PI to the printing apparatus 400. The information herein may refer to data, analog signals, and/or digital signals. Each of the digital signals may be represented as data 0 or data 1.

A KIOSK may include a computing device 200, an input device 210, and a printing apparatus (or printing device) 400.

The operation server 300 may transmit or receive information to or from the store PC (or store POS system) 700 through a second communication network NT2. The operation server 300 may store the information in the database 310 or read the information from the database 310 by accessing the database 310.

The operation server 300 may refer to a server computer which can provide a client (for example, 200 or 700) with information or services through a communication network NT1 or NT2, and the server computer may execute a server program for performing a method described in the present specification. The program may be coupled to hardware and stored in a storage medium (for example, a memory device) to provide a marketable securities issuing service according to the embodiments of the present invention.

The database 310 refers to a data storage device for storing information that can be accessed by the operation server 300, and a data storage device (for example, a hard disk drive (HDD) or a solid state drive (SSD)) corresponding to the database 310 may be placed (or installed) inside or outside the operation server 300 according to the embodiments. The operation server 300 may transmit a query to the database 310 to retrieve information stored in the database 310, receive information corresponding to the query from the database 310, and process information.

The input device 210 capable of inputting the information GII, D1, and/or D2 to the computing device 220 collectively refers to a keyboard, a computer mouse, a touch pad (including a touch panel or a touch screen), a barcode scanner, and/or an optical character recognition (OCR) scanner.

FIG. 2 is a data flow for describing a method of providing a gift voucher issuing service performed by the gift voucher issuing service system shown in FIG. 1.

Referring to FIGS. 1 and 2, when gift voucher issuance information GII is input to the computing device 200 through the input device 210 (S110), the gift voucher issuance information GII is transmitted to the operation server 300 through the first communication network NT1 (S120). An identifier (for example, an IP address) of the computing device 200 is transmitted to the operation server 300 along with the gift voucher issuance information GII (S120).

The operation server 300 may identify the computing device 200 using the identifier of the computing device 200, and transmit gift voucher printing information PI to the computing device 200. The first communication network NT1 may be a local area network (LAN), a wireless local area network (WLAN) such as Wi-Fi, or an Internet.

FIG. 3 shows information of a first table stored in a database of FIG. 1. As shown in FIG. 3, the gift voucher issuance information GII may include a gift voucher issuer (or gift voucher issuer information; GCI) and a face value (or face value information; VAL). The gift voucher issuer GCI may be one company (or a company name) or may be a plurality of companies (or company names). Each face value VAL may be the same face value (for example, 100,000) and may be a plurality of different face values (for example, 100,000 and 50,000). The operation server 300 may store and manage the gift voucher issuance information GII in a first table TABLE1.

FIG. 4 is a graphical user interface for describing a process of inputting gift voucher issuance information into a program executed in the computing device of FIG. 1. Referring to FIG. 4, the program (software) executed in a CPU of the computing device 200 may display the graphical user interface TPL on a display device of the computing device 200.

When a user (or seller) of the computing device 200 inputs "A company" as a gift voucher issuer in a first window 201 of the graphical user interface TPL, inputs "100,000" representing 100,000 won gift voucher in a first face value window 203, inputs "2" as the number of issuances in a first purchase window 205, inputs "A company" as a gift voucher issuer in a second window 202, inputs "50,000" representing a 50,000 won gift voucher in a second face value window 207, inputs "5" as the number of issuances in a second purchase window 209, and clicks or touches a transmission button 211 (S110), gift voucher issuance information GII indicating that two 100,000 won gift vouchers of the A company and five 50,000 won gift vouchers of the A company, and the identifier of the computing device 200 may be transmitted to the operation server 300 under control of the program executed in the CPU of the computing device 200.

Although FIG. 4 shows an example in which the user purchases (or requests for issuance) seven gift vouchers of the same department store (that is, A company), the user may input gift voucher issuance information GII for purchasing two 100,000 won (or two 10 US dollar) gift vouchers of an A department store and five 50,000 won (or five 5 US dollar) gift vouchers of a B department store into the graphical user interface TPL using the input device 210.

The operation server 300 stores the gift voucher issuance information GII in a first table TABLE1 included (or stored) in the database 310. The first table TABLE1 may be stored in a cache of the operation server 300 and then moved to the database 310. The operation server 300 generates a reception date of the gift voucher issuance information GII as a gift voucher issuance date (DoI; for example, Jul. 30, 2017), and stores the gift voucher issuance date DoI in the first table TABLE1 (S130).

The operation server 300 generates use registration numbers (D2-1 to D2-7, collectively D2) based on the number of issuances (for example, 7) included in the gift voucher issuance information GII, and stores each of these use registration numbers D2 in the first table TABLE1 (S140). For example, each of the use registration numbers D2-1 to D2-7 has a unique value.

According to an embodiment, the operation server 300 may further generate stamp duty information TAXI for each face value VAL in addition to steps S130 and S140 (S150). Since a stamp duty (or stamp tax) need to be paid in those countries with the Stamp Act, the stamp duty may vary depending on a face value of a gift voucher. When the stamp duty information TAXI for each face value VAL is stored in the database 310 in advance, the operation server 300 may retrieve the stamp duty information TAXI for each face value VAL to store it in the first table TABLE1 (S150).

According to an embodiment, the operation server 300 may further generate color information CI in addition to steps S130 and S140 (S160). The color information CI may determine colors of symbols, figures, and/or characters to be printed on a gift voucher sheet by the printing apparatus 400. When color information CI for each face value VAL is stored in the database 310 in advance, the operation server 300 may retrieve the color information CI for each face value VAL and store it in the first table TABLE1 (S160). According to an embodiment, the operation server 300 may further perform steps S150 and S160 in addition to steps S130 and S140.

The operation server 300 may generate gift voucher printing information PI and transmit the gift voucher printing information PI to the computing device 200 through the first communication network NT1 (S170). The gift voucher printing information PI includes gift voucher issuance information GII, gift voucher issuance date DoI, and use registration number D2. Depending on whether step S150 and/or step S160 are further performed, the gift voucher printing information PI may further include stamp duty information TAXI and/or color information CI in addition to the gift voucher issuance information GII, the gift voucher issuance date DoI), and the use registration number D2, and the gift voucher printing information PI generated by the operation server 300 may be transmitted to the computing device 200 through the first communication network NT1 according to various embodiments (S170).

According to the embodiments, the gift voucher issuance information GII and the gift voucher printing information PI may be encrypted and transmitted for security.

The computing device 200 may receive the gift voucher printing information PI and transmit the information PI to the printing apparatus 400, for example, a printer (S175). The printing apparatus 400 may receive the gift voucher printing information PI transmitted from the computing device 200, and issue (produce, ticket, or print) invalid gift vouchers in sheets by printing afterward printing information (for example, gift voucher issuance information, gift voucher issuance date, and use registration number) on a gift voucher sheet on which beforehand printing information (for example, printing paper management numbers) printed in advance (S180). At this time, the invalid gift vouchers cannot be used until issuance registration is performed thereon (S188).

FIG. 5 shows gift vouchers printed on a gift voucher sheet by the printing apparatus of FIG. 1 based on gift voucher printing information according to an embodiment of the present invention.

A process in which two 100,000 won gift vouchers of the A company and five 50,000 won gift vouchers of the A company are continuously output (or ticketed) by the printing apparatus 400 will be described in detail with reference to FIGS. 1 to 5. At this time, it is assumed that the gift voucher printing information PI includes gift voucher issuance information GII, gift voucher issuance date DoI, use registration number D2, and stamp duty information TAXI. The gift voucher issuance information GII includes a gift voucher issuer GCI, a first face value (VAL, for example, 100,000 won), the number of issuances (for example, 2) of the first face value (VAL, for example, 100,000 won), a second face value (VAL, for example, 50,000 won), and the number of issuances (for example, 5) of the second face value (VAL, for example, 50,000 won).

Each of printing paper management numbers D1-1 to D1-7 is printed in each of beforehand printing areas RG1 to RG7 of gift voucher sheets GC1 to GC7 in advance. Each of the printing paper management numbers D1-1 to D1-7 has a unique value. Each of the printing paper management numbers D1-1 to D1-7 may be a combination of letters and numbers, and may be a one-dimensional barcode, a two-dimensional barcode, or a three-dimensional barcode, but the present invention is not limited thereto. Each of the gift voucher sheets GC1 to GC7 is a gift voucher sheet specially produced by the Mint and to which anti-counterfeiting technologies are applied.

Each of the printing paper management numbers D1-1 to D1-7 is printed in each of the beforehand printing areas RG1 to RG7 in advance according to a printing method (for example, an intaglio printing method, a lithographic press or litho printing method, or a letterpress printing method) different from a printing method of the printing apparatus 400.

Each of cutting marks CM1 to CM6 is printed in advance between corresponding two gift voucher sheets GC1 and GC2, GC2 and GC3, . . . , GC6 and GC7 for accurate cutting. According to the embodiments, each gift voucher sheet can be specially designed to automatically recognize cutting positions instead of each of the cutting marks CM1 to CM6.

The printing apparatus (or printing device) 400 includes a processor 410, a memory device 420, a sensor 430, a printing element 440, and a cutter 450.

The processor 410 controls functions of the printing apparatus 400 and controls operations (or functions) of each of the components 420, 430, 440, and 450. The processor 410 receives gift voucher printing information PI and stores it in the memory device 420.

The memory device 420 stores firmware, software, and/or information necessary for an operation of the printing apparatus 400. The firmware can control an operation of the printing element 440 such that afterward printing information (for example, gift voucher printing information PI) is printed in the afterward printing area of a gift voucher sheet. The sensor 430 accurately senses each of the cutting marks CM1 to CM6 and transmits a sensing signal to the processor 410. The sensor 430 may be an image sensor, but the present invention is not limited thereto.

The printing element 440 refers to a set of hardwares necessary for printing afterward printing information corresponding to gift voucher printing information PI on each of the gift voucher sheets GC1 to GC7 under control of the processor 410. The gift voucher sheets GC1 to GC7 are a part of gift voucher sheets wound in a roll shape, and when each of the gift voucher sheets GC1 to GC7 is thermal paper, the printing element 440 refers to a set of pieces of hardwares capable of performing a thermal printing or direct thermal printing method. According to the embodiments, the printing element 440 may use an ink ribbon printing method, an inkjet printing method, or a laser printing method.

Conventional paper gift vouchers have been mass-printed (or mass-produced) in advance, and security guards are essential when the gift vouchers are stored or moved. However, according to the embodiments of the present invention, since the gift voucher sheets are packaged in a roll shape and only beforehand printing information is printed in the beforehand printing area of each of the gift voucher sheets, each of the gift voucher sheets cannot function as a gift voucher. Therefore, security guards are not required when each of the gift vouchers packaged in a roll shape is stored or moved.

The cutter 450 may accurately and automatically cut a center of each of the cutting marks CM1 to CM6 under the control of the processor 410 operating based on the sensing signal of the sensor 430. As a result, each of gift vouchers GC1A to GC7A can be ticketed in sheets by the cutter 450.

As shown in FIG. 5, the printing apparatus 400 prints first gift voucher issuance information (for example, A company, 100,000), a gift voucher issuance date (for example, 2017.7.30), a first use registration number D2-1, and a first stamp duty mark TAX1 on a first gift voucher sheet GC1 on which a first printing paper management number D1-1 is printed, and outputs a first gift voucher GC1A cut by the cutter 450. The first stamp duty mark (or stamp duty identifier; TAX1) is a mark (identifier or a combination of letters and numbers) including a stamp duty corresponding to a face value (VAL=100,000), and, at this time, the first gift voucher GC1A is an invalid gift voucher on which the issuance registration (S188) has not been performed.

Continuously, the printing apparatus 400 prints second gift voucher issuance information (for example, A company, 100,000), a gift voucher issuance date (for example, 2017.7.30), a second use registration number (D2-2), and the first stamp duty mark TAX1 on a second gift voucher sheet GC2 on which a second printing paper management number D1-2 is printed, and outputs a second gift voucher GC2A cut by the cutter 450. At this time, the second gift voucher GC2A is an invalid gift voucher on which the issuance registration (S188) has not been performed.

Continuously, the printing apparatus 400 prints third gift voucher issuance information (for example, A company, 50,000), a gift voucher issuance date (for example, 2017.7.30), a third use registration number D2-3, and a second stamp duty mark TAX2 on a third gift voucher sheet GC3 on which a third printing paper management number D1-3 is printed, and outputs a third gift voucher GC3A cut by the cutter 450. The second stamp duty mark TAX2 is a mark including a stamp duty corresponding to a face value (VAL=50,000), and, at this time, the third gift voucher GC3A is an invalid gift voucher on which the issuance registration (S188) has not been performed.

A final gift voucher GC7A is printed and ticketed in the same as or similar manner to a process in which each of the gift vouchers GC1A to GC3A is printed and ticketed. That is, the printing apparatus 400 prints seventh gift voucher issuance information (for example, A company, 50,000), a gift voucher issuance date (for example, 2017.7.30), a seventh use registration number D2-7, and the second stamp duty mark TAX2 on a seventh gift voucher sheet GC7 on which a seventh printing paper management number D1-7 is printed, and outputs the seventh gift voucher GC7A cut by the cutter 450. At this time, the seventh gift voucher GC7A is an invalid gift voucher on which the issuance registration (S188) has not been performed. In the present invention, a printing paper management number is printed in the beforehand printing area of a gift voucher sheet (or gift voucher printing sheet) to manage the gift voucher sheet.

Each of the use registration numbers D2-1 to D2-7 printed in each of afterward printing areas RF1 to RF7 of the gift vouchers GC1A to GC7A may be a combination of letters and numbers, a one-dimensional barcode, a two-dimensional barcode, or a three-dimensional barcode, but the present invention is not limited thereto.

As described above, gift voucher issuance information, a gift voucher issuance date, a use registration number, and a stamp duty mark are printed in the post-printing area of a gift voucher sheet as post-printing information processed by the operation server 300.

Since each of the printing paper management numbers D1-1 to D1-7 is printed on each of the gift voucher sheets GC1 to GC7 according to a printing method of the Mint, these numbers may not be erased over time, but each of the use registration numbers D2-1 to D2-7 may be erased over time because they are printed according to a printing method of the printing apparatus 400 (for example, the inkjet printing method, a laser jet printing method, the ink ribbon printing method, the thermal printing or direct thermal printing method, or a thermal transfer printing method.

Therefore, when each of the valid gift vouchers GC1A to GC7A is used, the operation server 300 may use each of the printing paper management numbers D1-1 to D1-7 as an authentication (or confirmation) number for authentication (or confirmation) to confirm validity of each of the valid gift vouchers GC1A to GC7A. A description thereof will be described in detail with reference to steps S250, S260, and S265 of FIG. 6.

When a user of the computing device 200 inputs a first printing paper management number D1-1 and a first use registration number D2-1 printed on the first gift voucher GC1A into the computing device 200 as a pair through the input device 210 (S182), the computing device 200 transmits the first printing paper management number (D1=D1-1) and the first use registration number (D2=D2-1) to the operation server 300 through the first communication network NT1 (S186).

The operation server 300 receives the first printing paper management number D1-1 and the first use registration number D2-1, and performs issuance registration on the first printing paper management number D1-1 and the first use registration number D2-1 as a pair with reference to a first use registration number D2-1 stored in the first table TABLE1 of FIG. 3 (S188).

For example, the operation server 300 compares the first use registration number D2-1 stored in the first table TABLE1 with the first use registration number D2-1 transmitted from the computing device 200 for issuance registration, and registers (or stores) the first printing paper management number D1-1 and the first use registration number D2-1 as a pair in the first table TABLE1 when they match. A first invalid gift voucher is finally converted into a valid gift voucher by the issuance registration. Accordingly, the valid gift voucher can be used in stores.

When the user of the computing device 200 inputs the seventh printing paper management number D1-7 and the seventh use registration number D2-7 printed on the seventh give voucher GC7A as a pair into the computing device 200 through the input device 210 (S182), the computing device 200 transmits the seventh printing paper management number (D1=D1-7) and the seventh use registration number (D2=D2-7) to the operation server 300 through the first communication network NT1 (S186).

The operation server 300 receives the seventh printing paper management number D1-7 and the seventh use registration number D2-7, and performs issuance registration on the seventh printing paper management number D1-7 and the seventh use registration number D2-7 as a pair with reference to a seventh use registration number D2-7 stored in the first table TABLE1 of FIG. 3 (S188). For example, the operation server 300 compares the seventh use registration number D2-7 stored in the first table TABLE1 with the seventh use registration number D2-7 transmitted from the computing device 200 for issuance registration, and registers (or stores) the seventh printing paper management number D1-7 and the seventh use registration number D2-7 as a pair in the first table TABLE1 (S188) when they match. A seventh invalid gift voucher is finally converted into a valid gift voucher by the issuance registration. Accordingly, the valid gift voucher can be used in stores.

When each of the printing paper management numbers (D1-1 to D1-7, collectively referred to as D1) and each of the use registration numbers (D2-1 to D2-7, collectively referred to as D2) are transmitted as a pair to the operation server 300 through the computing device 200 (S182 and S186), the operation server 300 performs issuance registration on each of the printing paper management numbers D1-1 to D1-7 and each of the use registration numbers D2-1 to D2-7 as a pair with reference to each of the use registration numbers D2-1 to D2-7 stored in the first table TABLE1 of FIG. 3 (S188).

Through such issuance registration (S188), each of invalid gift vouchers GC1A to GC7A is immediately converted into a valid gift voucher. The issuance registration (S188) herein refers to a process of converting an invalid gift voucher into a valid gift voucher. When the issuance registration is completed (S188), the operation server 300 may transmit a message indicating a completion of the issuance registration to the computing device 200 through the first communication network NT1.

The gift voucher issuing service system 100A according to the present invention can immediately issue a corresponding gift voucher by printing corresponding afterward printing information (for example, corresponding gift voucher printing information) in the afterward printing area of a corresponding gift voucher sheet in real time and continuously using the printing apparatus 400 even though gift voucher issuers are different from each other and/or the face values of each of gift vouchers to be issued are different from each other.

In addition, since the gift voucher issuing service system 100A according to an embodiment of the present invention can immediately print and ticket a desired gift voucher in real time and continuously only when necessary, it is efficient to manage and store gift voucher sheets wound in a roll shape as compared to storing and managing conventional gift vouchers.

According to the embodiments, when it is assumed that the gift voucher printing information PI includes only gift voucher issuance information, a gift voucher issuance date DoI, and a use registration number D2, the printing apparatus 400 performs ticketing (note issuing) by printing each of the gift vouchers GC1A to GC7A which do not include each of the stamp duty marks TAX1 and TAX2. That is, the printing apparatus 400 may issue or ticket each of the gift vouchers GC1A to GC7A by printing the gift voucher issuance information, the gift voucher issuance date DoI, and the use registration number D2 in the afterward printing area of each of the gift voucher sheets GC1 to GC7.

According to the embodiments, when it is assumed that the gift voucher printing information PI further includes color information CI in addition to the gift voucher issuance information, the gift voucher issuance date DoI, and the use registration number D2, the printing apparatus 400 may ticket each of the gift vouchers GC1A to GC7A in sheets by printing the gift voucher issuance information, the gift voucher issuance date DoI, and/or the use registration number D2 in the afterward printing area of each of the gift voucher sheets GC1 to GC7 in a color corresponding to the color information CI. For example, the color may vary depending on a face value VAL, and the color corresponding to the color information CI may be one or more colors.

According to the embodiments, when it is assumed that the gift voucher printing information PI further includes stamp duty information TAX1 and color information CI in addition to the gift voucher issuance information, the gift voucher issuance date DoI, and the use registration number D2, the printing apparatus 400 may ticket each of the gift vouchers GC1A to GC7A by printing the gift voucher issuance information, the gift voucher issuance date DoI, a stamp duty mark corresponding to the stamp duty information TAX, and/or the use registration number D2 on each of the gift voucher sheets GC1 to GC7 in a color corresponding to the color information CI.

According to the embodiments, when it is assumed that the gift voucher printing information PI further includes additional information in addition to the gift voucher issuance information, the gift voucher issuance date DoI, and the use registration number D2, the printing apparatus 400 may ticket each of the gift vouchers GC1A to GC7A by printing the gift voucher issuance information, the gift voucher issuance date DoI, the use registration information D2, and the additional information on each of the gift voucher sheets GC1 to GC7. The additional information may include a message from a gift voucher buyer (for example, happy birthday to xxx*), a message for advertisement, a discount coupon, a parking coupon, a preferential coupon, an identifier for identifying a gift voucher seller, a gift voucher use place, and the like. The message of a gift voucher buyer may be input to the computing device 200 and transmitted to the operation server 300 along with the gift voucher issuance information GII. The message for advertisement, the discount coupon, the parking coupon, the preferential coupon, the identifier for identifying a gift voucher seller, and/or the gift voucher use place may be stored in the database 310 in advance and included in the gift voucher printing information PI.

Figure 6:
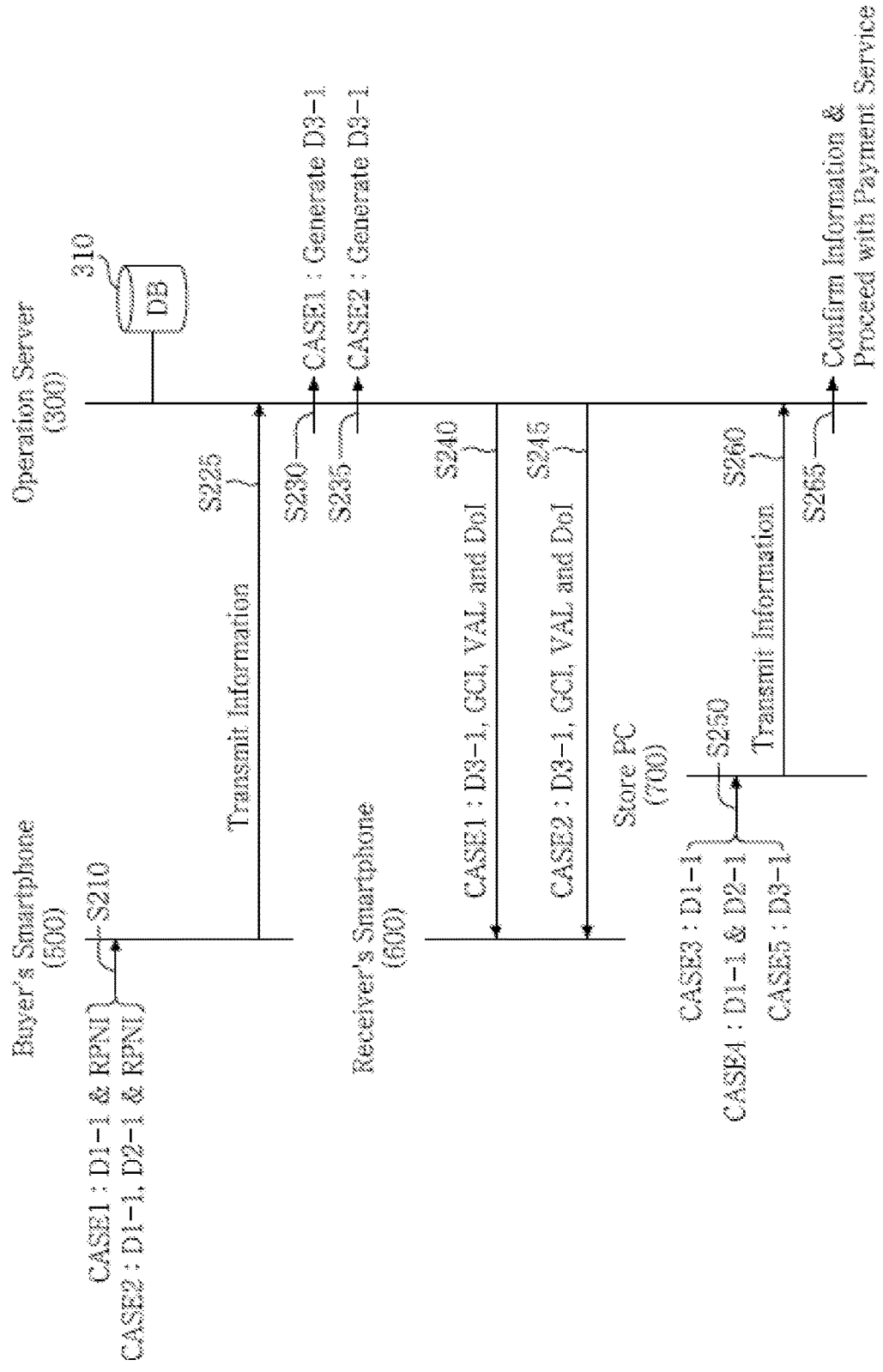
FIG. 6 is a data flow for describing use examples of a gift voucher issued by the gift voucher issuing service system shown in FIG. 1.

FIG. 6 is a data flow for describing use examples of a gift voucher issued by the gift voucher issuing service system show in FIG. 1. Referring to FIGS. 1 to 6, when information is input to a first mobile device (or a buyer's smartphone) 500 by a user of the first mobile device 500 (S210) after the first gift voucher GC1A is converted into a valid gift voucher through the issuance registration (S188), a first application program executed by a first processor of the first mobile device 500 transmits a mobile gift voucher transmission request including the information to the operation server 300 through a communication network (for example, a Wi-Fi network, a wireless network, or a mobile communication network) (S225).

In a case 1 (CASE1), the information input to the first mobile device 500 includes the first printing paper management number D1-1 and an ID (RPNI) of a second mobile device (or a receiver's smartphone) 600 (S210).

In a case 2 (CASE2), the information input to the first mobile device 500 includes the first printing paper management number D1-1, the first use registration number D2-1, and the ID (RPNI) of the second mobile device 600 (S210).

Each of the mobile devices 500 and 600 may be a smartphone, a tablet PC, a mobile internet device (MID), an Internet of Things (IoT) device, or a wearable computer. For example, the ID (RPNI) of the second mobile device 600 may be a phone number of a smartphone.

In accordance with the case 1 (CASE1) or the case 2 (CASE2), the operation server 300 may generate a new payment authentication number D3-1 in response to the mobile gift voucher transmission request transmitted from the first mobile device 500, store this number D3-1 in the first table TABLE1 of the database 310, and invalidate at least one of the first use registration number D2-1 and the printing paper management number D1-1 stored in the first table TABLE1 (S230 and S235).

The operation server 300 may generate a mobile gift voucher and transmit the mobile gift voucher to the second mobile device 600 identified by the ID (RPNI) of the second mobile device 600. In accordance with the case 1 (CASE1) or the case 2 (CASE2), the mobile gift voucher transmitted to the second mobile device 600 includes the payment authentication number D3-1, a gift voucher issuer GCI, a face value VAL, and an issuance date DoI (S240 and S245).

A second application program executed by a second processor of the second mobile device 600 may receive the mobile gift voucher, store it in a memory device of the second mobile device 600, and display the mobile gift voucher stored in the memory device on a display device of the second mobile device 600 according to a user's operation of the second mobile device 600.

In accordance with a case 3 (CASE3), when the first printing paper management number D1-1 printed on the first gift voucher (for example, the paper gift voucher; GC1A) converted into a valid gift voucher is input to the store PC (or POS system) 700 (S250), the store PC 700 transmits a confirmation request including the first printing paper management number D1-1 to the operation server 300 through the second communication network NT2 (S260).

The operation server 300 may confirm validity of the first printing paper management number D1-1 with reference to the first table TABLE1 (S265), and transmit a message indicating that the first gift voucher GC1A is available to the store PC 700 after the validity is confirmed. At this time, the validity is determined according to whether the first printing paper management number D1-1 stored in the first table TABLE1 matches the first printing paper management number D1-1 transmitted from the store PC 700.

In accordance with the case 3 (CASE3), when the first printing paper management number D1-1 printed on the first gift voucher GC1A and a payment amount are input to the store PC 700 (S250), the store PC 700 transmits a payment request including the first printing paper management number D1-1 and the payment amount to the operation server 300 through the second communication network NT2 (S260). In response to the payment request, the operation server 300 may confirm the validity of the first printing paper management number D1-1 with reference to the first table TABLE1, proceed with a payment service after the validity is confirmed, that is, when the first gift voucher GC1A is available (S265), and transmit a result to the store PC 700.

In accordance with a case 4 (CASE4), when the first printing paper management number D1-1 and the first use registration number D2-1 printed on the first gift voucher GC1A converted into a valid gift voucher are input to the store PC 700 (S250), the store PC 700 may transmit the first printing paper management number D1-1 and the first use registration number D2-1 as a pair to the operation server 300 through the second communication network NT2 (S260).

According to whether the first printing paper management number D1-1 and the first use registration number D2-1 stored in the first table TABLE1 match the first printing paper management number D1-1 and the first use registration number D2-1 transmitted from the store PC 700, respectively, the operation server 300 may confirm the validity of these numbers D1-1 and D2-1, and transmit a message indicating that the first gift voucher GC1A is available to the store PC 700 after the validity is confirmed.

In accordance with the case 4 (CASE4), when the first printing paper management number D1-1 and the first use registration number D2-1 printed on the first gift voucher GC1A, and the payment amount are input to the store PC 700 (S250), the store PC 700 transmits a payment request including the first printing paper management number D1-1, the first use registration number D2-1, and the payment amount to the operation server 300 through the second communication network NT2 (S260).

The operation server 300 may confirm the validity of the first printing paper management number D1-1 and the first use registration number D2-1 with reference to the first table TABLE1, proceed with a payment service after the validity is confirmed, that is, when the first gift voucher GC1A is available (S265), and transmit a result to the store PC 700.

In accordance with a case 5 (CASE5), when the payment authentication number D3-1 of the mobile gift voucher transmitted to the second mobile device 600 is input to the store PC 700 (S250), the store PC 700 may transmit the payment authentication number D3-1 to the operation server 300 through the second communication network NT2 (S260). The operation server 300 may confirm the validity of the payment authentication number D3-1 with reference to the first table TABLE1 (S265), and transmit a message indicating that the first gift voucher GC1A is available to the store PC 700 after the validity is confirmed.

In accordance with the case 5 (CASE5), when a payment amount and the payment authentication number D3-1 of the mobile gift voucher transmitted to the second mobile device 600 are input to the store PC 700 (S250), the store PC 700 may transmit the payment amount and the payment authentication number D3-1 to the operation server 300 through the second communication network NT2 (S260). The operation server 300 may confirm the validity of the payment authentication number D3-1 with reference to the first table TABLE1, proceed with a payment service when the mobile gift voucher is available (S265), and transmit a result to the store PC 700.

When the operation server 300 receives a payment request including a payment amount along with information corresponding to each case CASE3, CASE4, or CASE5, the operation server 300 may proceed with a payment service for the payment amount according to the payment request (S265), and transmit a result to the store PC 700. Here, the payment service is not only payment processing by the operation server 300 but also every payment processing by payment gateway (PG) operators, value added network (VAN) operators, and/or payment servers connected to the operation server 300.

Figure 7:
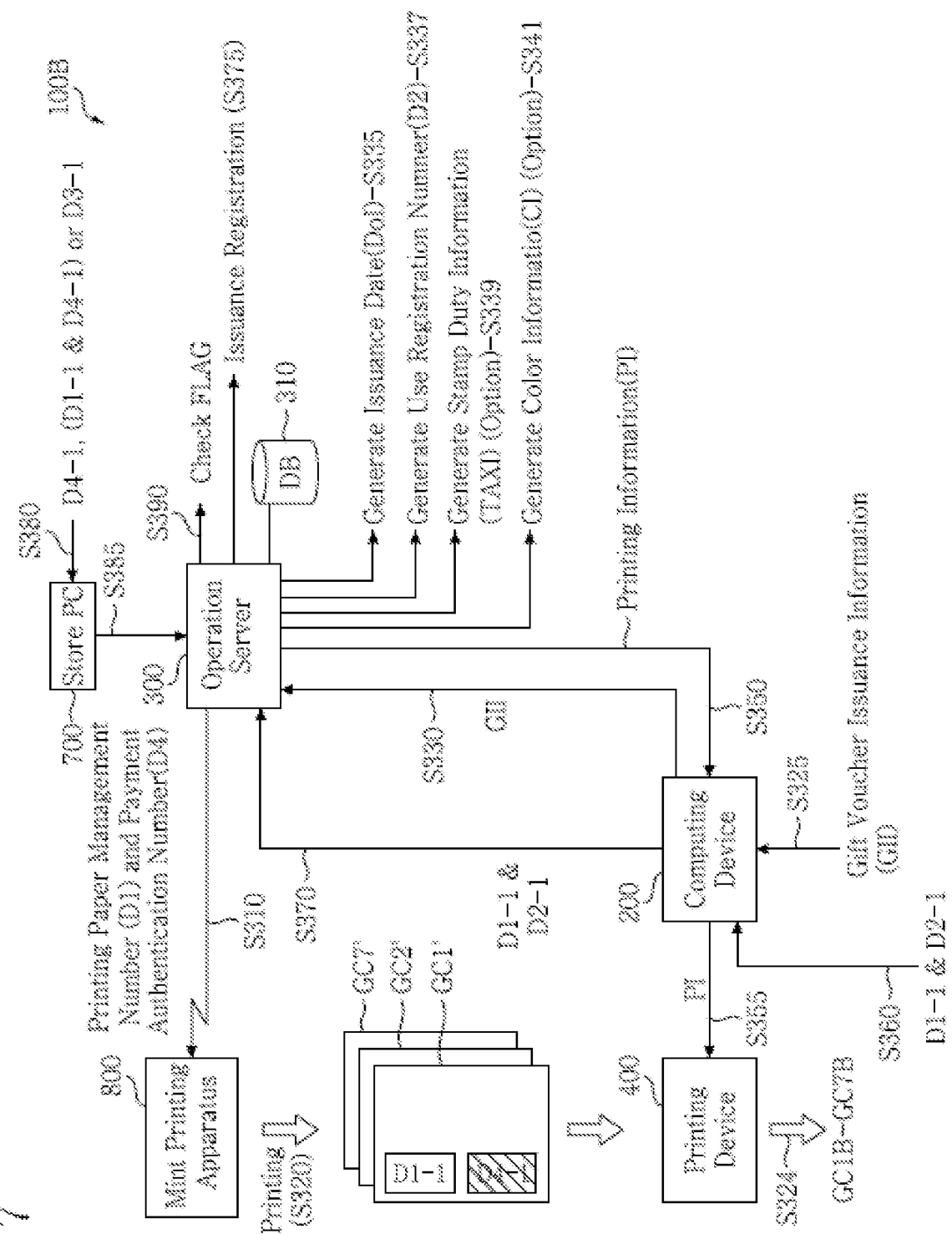
FIG. 7 is a schematic block diagram of a gift voucher issuing service system according to embodiments of the present invention.

FIG. 7 is a schematic block diagram of the gift voucher issuing service system according to the embodiments of the present invention, and FIG. 8 shows data included in a second table stored in a database shown in FIG. 7.

Referring to FIG. 7, a gift voucher issuing (producing, ticketing, or printing) service system 100B includes a computing device 200, an operation server 300, and a printing apparatus 400, and may further include the store PC 700 and/or a Mint printing apparatus 800 according to the embodiments. For example, the Mint may refer to a money-making agency or a government agency.

In a method of providing a gift voucher issuing service implemented using the gift voucher issuing service system 100A or 100B, a paper gift voucher may be immediately printed, issued, ticketed, or outputted at a place equipped with the devices 200 and 400.

When the operation server 300 generates a plurality of printing paper management numbers D1 and a plurality of payment authentication numbers D4, and transmits these numbers D1 and D2 to a server of the Mint through a communication network (S310), the server may print corresponding printing paper management number and a corresponding payment authentication number in the beforehand printing area of a corresponding gift voucher sheet by controlling the Mint printing apparatus 800 (S320). The printing paper management number and the payment authentication number which are paired may be printed in the beforehand printing area of a gift voucher sheet.

For example, as shown in FIG. 8, it is assumed that the operation server 300 generates seven payment authentication numbers (D4-1 to D4-7, collectively referred to as D4) and seven printing paper management numbers (D1-1 to D1-7, collectively referred to as D1), stores these numbers D1 and D4 in the second table TABLE2, and transmits these numbers D1 and D4 to the server of the Mint. Each table TABLE1 or TABLE2 may be stored in the database 310 and managed by the operation server 300. Each table TABLE1 or TABLE2 may be a data structure or a lookup table, but the present invention is not limited thereto.

As described with reference to FIGS. 2 and 4, when gift voucher issuance information GII is input to the computing device 200 through an input device (for example, 210 of FIG. 1) (S325), the computing device 200 transmits the gift voucher issuance information GII to the operation server 300 (S330). At this time, the identifier of the computing device 200 is transmitted to the operation server 300 along with the gift voucher issuance information GII (S330).

It is assumed that the gift voucher issuance information GII is two 100,000 won gift vouchers of the A company and two 50,000 won gift vouchers of the A company. The gift voucher issuance information GII includes a gift voucher issuer GCI, a first face value (VAL=100,000), the number (for example, 2 pieces) of gift vouchers with the first face value (VAL=100,000), a second face value (VAL=50,000), and the number (for example, 5 pieces) of gift vouchers with the second face value (VAL=50,000).

Figure 9:
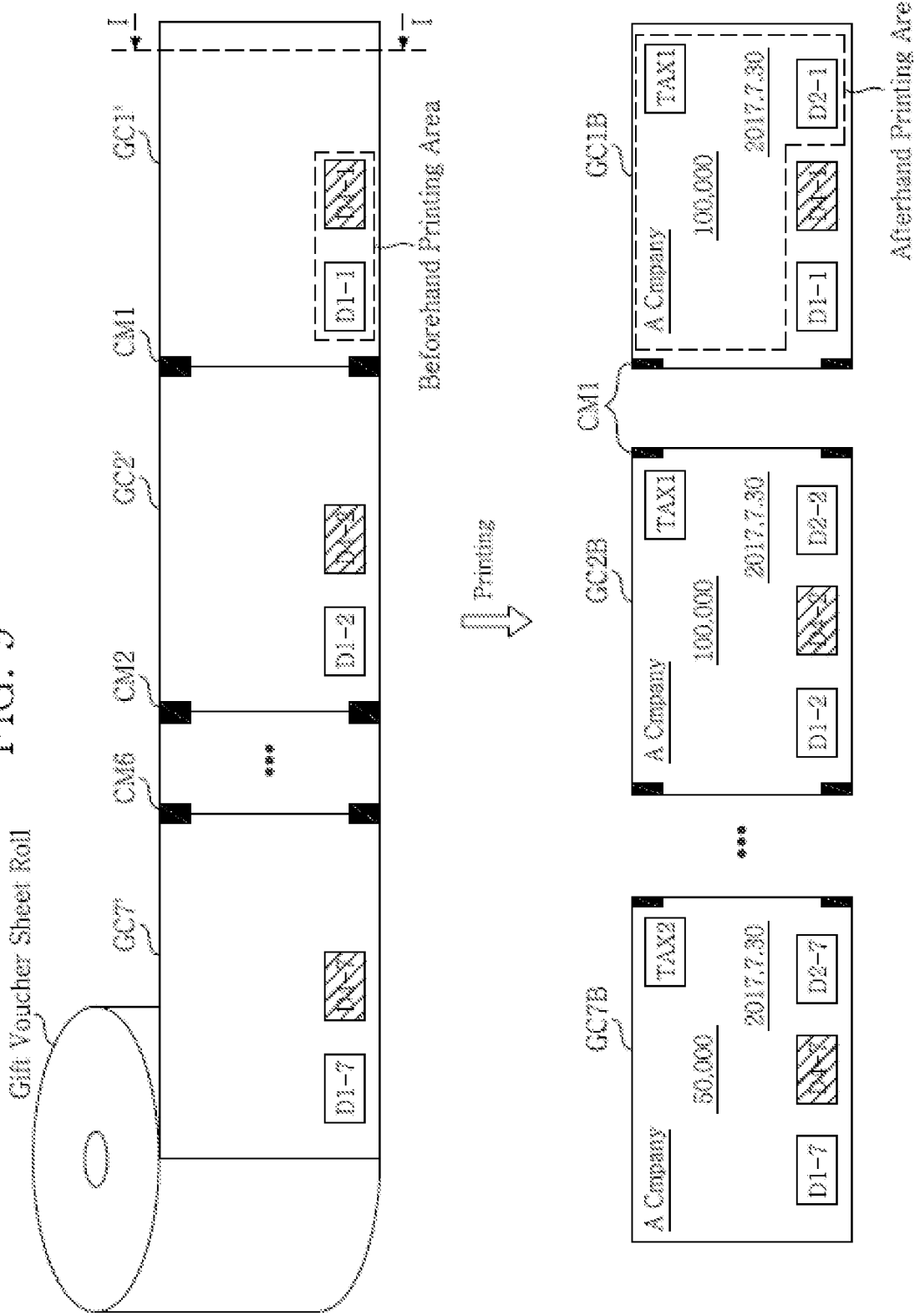
FIG. 9 is an embodiment of gift vouchers printed by a printing apparatus shown in FIG. 7.

FIG. 9 is an embodiment of gift vouchers printed by the printing apparatus shown in FIG. 7. Referring to FIGS. 7 to 9, the Mint printing apparatus 800 prints the first printing paper management number D1-1 and the first payment authentication number D4-1 in the beforehand printing area of a first gift voucher sheet GC1', and applies an opaque material onto a first payment authentication number D4-1. The opaque material may perform a function of concealing the first payment authentication number D4-1 not to be exposed to the outside, and when the opaque material is removed (or scratched-off), the first payment authentication number D4-1 is exposed to the outside.

The Mint printing apparatus 800 prints the second printing paper management number D1-2 and a second payment authentication number D4-2 in the beforehand printing area of a second gift voucher sheet GC2', and applies an opaque material onto the second payment authentication number D4-2 to conceal the second payment authentication number D4-2. A corresponding printing paper management number and a corresponding payment authentication number are printed as a pair in the each beforehand printing area of a third gift voucher sheet to a sixth gift voucher sheet, and an opaque material is applied onto the corresponding payment authentication number to conceal the corresponding payment authentication number.

The Mint printing apparatus 800 prints the seventh printing paper management number D1-7 and a seventh payment authentication number D4-7 in the beforehand printing area of a seventh gift voucher sheet GC7', and applies an opaque material onto the seventh payment authentication number D4-7 to conceal the seventh payment authentication number D4-7. When the opaque material applied onto each of the payment authentication numbers D4-1 to D4-7 is removed (or scratched off), each of the payment authentication numbers D4-1 to D4-7 is exposed to the outside.

As shown in FIG. 8, the operation server 300 stores the gift voucher issuer (A company) among the gift voucher issuance information GII in a gift voucher issuer field of the second table TABLE2, and stores each face value (VAL, for example, 100,000 won and 50,000 won) in a face value field of the second table TABLE2.

The operation server 300 generates a reception date of the gift voucher issuance information GII as an issuance date DoI, and stores the issuance date DoI in an issuance date field of the second table TABLE2 (S335). The operation server 300 generates the use registration numbers D2-1 to D2-7 for each face value VAL, and stores each of the use registration numbers D2-1 to D2-7 in a use registration number field of the second table TABLE2 (S337).

According to the embodiments, the operation server 300 may further generate stamp duty information TAXI for each face value VAL, and store each piece of the stamp duty information TAXI in a stamp duty information field of the second table TABLE2 (S339). When each piece of the stamp duty information TAXI is stored in the database 310 in advance, the operation server 300 retrieves stamp duty information TAXI corresponding to each face value VAL, and stores the retrieved stamp duty information TAXI in the stamp duty information field of the second table TABLE2 (S339).

The operation server 300 may further generate color information CI for each face value VAL, and store each piece of the color information CI in a color information field of the second table TABLE2 (S341). When each piece of the color information CI is stored in the database 310 in advance, the operation server 300 retrieves color information CI corresponding to each face value VAL and stores the retrieved color information CI in the color information field of the second table TABLE2 (S341). Steps S339 and/or S341 may be performed optionally in addition to steps S335 and S341.

The operation server 300 may generate gift voucher printing information PI and transmit the gift voucher printing information PI to the computing device 200 (S350). The gift voucher printing information PI includes a gift voucher issuers GCI, a face value VAL, an issuance date DoI, and use registration numbers (D2-1 to D2-7, collectively referred to as D2), and may further include stamp duty information TAXI and/or color information CI optionally.

The computing device 200 may transmit the gift voucher printing information (PI) to the printing apparatus 400 (S355). The printing apparatus 400 may print the gift voucher issuer (GCI, for example, A company), the face value (VAL, for example, 100,000 or 50,000), the issuance date (DoI, for example, 2017.7.30), and the use registration information (any one of D2-1 to D2-7) in the afterward printing area of each of the gift voucher sheets GC1' to GC7' according to the gift voucher printing information (PI), and issue, ticket, or output each of invalid gift vouchers GC1B to GC7B.

According to an embodiment, when the gift voucher printing information PI further includes the stamp duty information TAXI in addition to the gift voucher issuer GCI, the face value VAL, the issuance date DoI, and the use registration number D2, the printing apparatus 400 may print the gift voucher issuer (GCI, for example, A company), the face value (VAL, for example 100,000 or 50,000), the issuance date (DoI, for example, 2017.7.30), the user registration number (any one of D2-1 to D2-7), and a stamp duty mark TAX1 or TAX2 corresponding to the stamp duty information TAXI in the afterward printing area of each of the gift voucher sheets GC1' to GC7' according to the gift voucher printing information PI, and may issue, ticket, or output each of the invalid gift vouchers GC1B to GC7B.

According to an embodiment, when the gift voucher printing information PI further includes the color information CI in addition to the gift voucher issuer GCI, the face value VAL, the issuance date DoI, and the use registration number D2, the printing apparatus 400 may print at least one of the gift voucher issuer (GCI, for example, A company), the face value (VAL, for example 100,000 or 50,000), the issuance date (DoI, for example, 2017.7.30), and the user registration number (any one of D2-1 to D2-7) in a color corresponding to the color information CI in the afterward printing area of each of the gift voucher sheets GC1' to GC7' according to the gift voucher printing information PI, and may issue, ticket, or output each of the invalid gift vouchers GC1B to GC7B. The color may mean one or more colors.

According to an embodiment, when the gift voucher printing information PI further includes the stamp duty information TAXI and the color information CI in addition to the gift voucher issuer GCI, the face value VAL, the issuance date DoI, and the use registration number D2, the printing apparatus 400 may print at least one of the gift voucher issuer (GCI, for example, A company), the face value (VAL, for example 100,000 or 50,000), the issuance date (DoI, for example, 2017.7.30), the user registration number (any one of D2-1 to D2-7), and a stamp duty mark TAX1 or TAX2 corresponding to the stamp duty information TAXI in a color corresponding to the color information CI in the afterward printing area of each of the gift voucher sheets GC1' to GC7' according to the gift voucher printing information PI, and may issue, ticket, or output each of the invalid gift vouchers GC1B to GC7B. The color may mean one or more colors.

As described with reference to FIG. 5, the cutter 450 of the printing apparatus 400 may issue, ticket, or output each of the invalid gift vouchers GC1B to GC7B by accurately cutting centers of the cutting marks CM1 to CM6 (S324).

Referring to FIGS. 7 to 9, it is assumed that the gift voucher printing information (PI) further includes the stamp duty information TAXI in addition to the gift voucher issuer GCI, the face value VAL, the issuance date DoI, and the use registration number D2.

A first invalid gift voucher GC1B includes beforehand printing information (for example, the first printing paper management number D1-1 and the first payment authentication number D4-1 concealed by the opaque material) printed in the beforehand printing area, and afterward printing information (for example, the first use registration number D2-1, the gift voucher issuer (for example, A company), the face value (for example 100,000), the issuance date (for example, 2017.7.30), and the first stamp duty mark TAXI) printed in the afterward printing area.

A second invalid gift voucher GC2B includes beforehand printing information (for example, the second printing paper management number D1-2 and the second payment authentication number D4-2 concealed by the opaque material) printed in the beforehand printing area, and afterward printing information (for example, the second use registration number D2-2, the gift voucher issuer (for example, A company), the face value (for example 100,000), the issuance date (for example, 2017.7.30), and the first stamp duty mark TAXI) printed in the afterward printing area.

A seventh invalid gift voucher GC7B includes beforehand printing information (for example, the seventh printing paper management number D1-7 and the seventh payment authentication number D4-7 concealed by the opaque material) printed in the beforehand printing area, and afterward printing information (for example, the seventh use registration number D2-7, the gift voucher issuer (for example, A company), the face value (for example 50,000), the issuance date (for example, 2017.7.30), and the second stamp duty mark TAX2) printed in the afterward printing area.

When the first printing paper management number D1-1 and the first use registration number D2-1 are input to the computing device 200 after each of the invalid gift vouchers GC1B to GC7B is output (S360), the computing device 200 transmits the first printing paper management number D1-1 and the first use registration number D2-1 to the operation server 300 (S370).

The operation server 300 performs issuance registration using the first printing paper management number D1-1 and the first use registration number D2-1 (S375). That is, the operation server 300 determines whether to perform issuance registration, that is, whether to change a flag FLAG, according to whether the first printing paper management number D1-1 stored in the second table TABLE2 matches the first printing paper management number D1-1 transmitted from the computing device 200 and whether the first use registration number D2-1 stored in the second table TABLE2 matches the first use registration number D2-1 transmitted from the computing device 200 (S375).

For example, the issuance registration (S375) may mean a change in bit value of the flag FLAG from a first value (for example, data 0) to a second value (for example, data 1), but the present invention is not limited thereto. For example, when the bit value of the flag FLAG is changed, the invalid gift vouchers are converted into valid gift vouchers.

Since the issuance registration (S375) of each of the invalid gift vouchers GC2B to GC7B is substantially the same as or similar to the issuance registration (S375) of the first invalid gift voucher GC1B, detailed description of the issuance registration of each of the invalid gift vouchers GC2B to GC7B will be omitted.

When the opaque material applied onto a first valid gift voucher is removed or scratched off after the first invalid gift voucher GC1B is converted into the first valid gift voucher through the issuance registration (S375), the first payment authentication number D4-1 is exposed to the outside.

When the first payment authentication number D4-1 is input to the store PC 700 (S380), the store PC 700 transmits the first payment authentication number D4-1 to the operation server 300 through a communication network (S385). The operation server 300 confirms the bit value of the flag FLAG of the second table TABLE2 using the first payment authentication number D4-1 (S390).

For example, when the bit value of the flag FLAG is a second value, the operation server 300 may transmit a message (or an available amount) indicating that the first valid gift voucher is available to the store PC 700 through a communication network. As described above, the operation server 300 may transmit a result of payment to the store PC 700 through the communication network.

However, when the first payment authentication number D4-1 printed on the first invalid gift voucher GC1B on which the issuance registration (S375) has not been performed is input to the operation server 300 through the store PC 700, since the bit value of the flag FLAG of the second table TABLE2 is a first value, the operation server 300 transmits a message indicating that the first invalid gift voucher GC1B is not available to the store PC 700 or transmits a message indicating that a payment is not possible to the store PC 700.

Step S380 will be described with reference to step S460 of FIG. 10.

Figure 10:
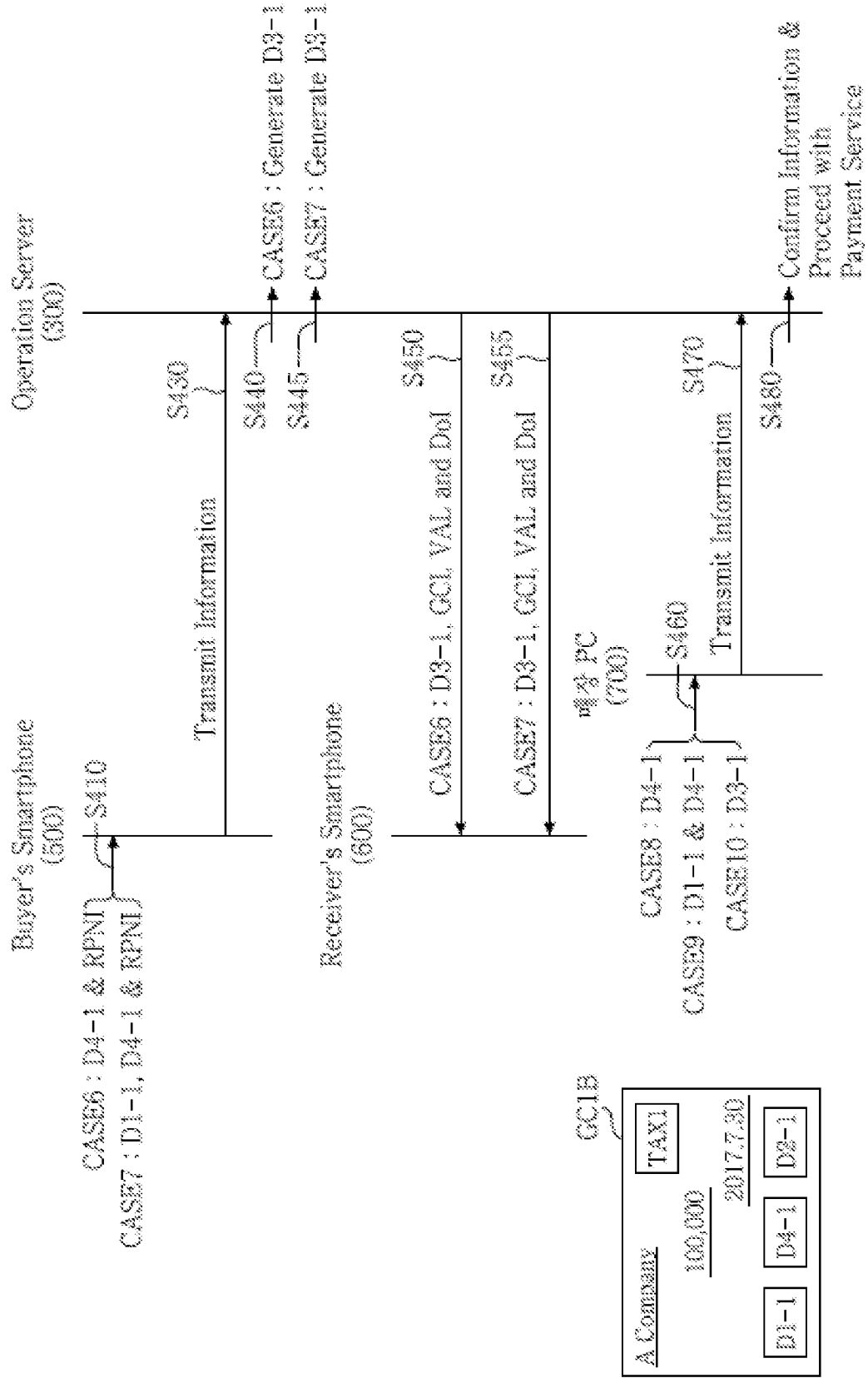
FIG. 10 is a data flow for describing use examples of a gift voucher issued by the gift voucher issuing service system shown in FIG. 7.

FIG. 10 is a data flow for describing use examples of a gift voucher issued by the gift voucher issuing service system shown in FIG. 7. Use examples of FIG. 10 are similar to the use examples of FIG. 6.

When information is input to the first mobile device 500 by the user of the first mobile device 500 after the issuance registration (S375) for the first gift voucher GC1B is completed and the opaque material applied onto the first payment authentication number D4-1 is removed (S410), the first application program executed by the first processor of the first mobile device 500 transmits a mobile gift voucher transmission request to the operation server 300 through a communication network (S430).

In a case 6 CASE6, the information input to the first mobile device 500 includes the first payment authentication number D4-1 and the ID (RPNI) of the second mobile device 600 (S410).

In a case 7 CASE7, the information input to the first mobile device 500 includes the first printing paper management number D1-1, the first payment authentication number D4-1, and the ID (RPNI) of the second mobile device 600 (S410).

In accordance with the case 6 CASE6 and the case 7 CASE7, the operation server 300 may generate a payment authentication number D3-1 in response to the mobile gift voucher transmission request, store this number D3-1 in the second table TABLE2 of the database 310, and invalidate at least one of the first printing paper management number D1-1, the first use registration number D2-1, and the first payment authentication number D4-1, which are stored in the second table TABLE2. According to the embodiments, the first payment authentication number D4-1 may be replaced with the new payment authentication number D3-1.

The operation server 300 may generate a mobile gift voucher and transmit the mobile gift voucher to the second mobile device 600 identified by the ID (RPNI) of the second mobile device 600. In accordance with the case 6 CASE6 and the case 7 CASE7, the mobile gift voucher transmitted to the second mobile device 600 includes the new payment authentication number D3-1, a gift voucher issuer GCI, a face value VAL, and an issuance date DoI (S450 and S455).

The second application program executed by the second processor of the second mobile device 600 may receive the mobile gift voucher, store it in the memory device of the second mobile device 600, and display the mobile gift voucher stored in the memory device on the display device of the second mobile device 600 according to the user's operation of the second mobile device 600.

In accordance with a case 8 CASE8, when the first payment authentication number D4-1 printed on the first gift voucher (for example, a paper gift voucher; GC1B) converted into a valid gift voucher is input to the store PC 700 (S380 and S460), the store PC 700 transmits the first payment authentication number D4-1 to the operation server 300 through a communication network (S385 and S470). The operation server 300 may confirm the validity of the first payment authentication number D4-1 with reference to the second table TABLE2 (S390 and S480), and transmit a message indicating that the first gift voucher GC1B is available to the store PC 700.

In accordance with a case 9 CASE9, when the first printing paper management number D1-1 and the first payment authentication number D4-1 printed on the first gift voucher GC1B converted into a valid gift voucher are input to the store PC 700 (S380 and S460), the store PC 700 transmits the first printing paper management number D1-1 and the first payment authentication number D4-1 to the operation server 300 through a communication network (S385 and S470). The operation server 300 may confirm the validity of the first printing paper management number D1-1 and the first payment authentication number D4-1 with reference to the second table TABLE2 (S390 and S480), and transmit the message indicating that the first gift voucher GC1B is available to the store PC 700.

In accordance with a case 10 CASE10, when the payment authentication number D3-1 of the mobile gift voucher transmitted to the second mobile device 600 is input to the store PC 700 (S380 and S460), the store PC 700 transmits the payment authentication number D3-1 to the operation server 300 through a communication network (S385 and S470). The operation server 300 may confirm the validity of the payment authentication number D3-1 with reference to the second table TABLE2 (S390 and S480), and transmit the message indicating that the first gift voucher GC1B is available to the store PC 700.

As described with reference to FIG. 6, when the operation server 300 receives a payment request including a payment amount along with information corresponding to each case CASE8, CASE9, or CASE10, the operation server 300 may proceed with a payment service for the payment amount (S480) and transmit a result to the store PC 700. Here, a progress of the payment service includes not only payment by the operation server 300 but also every payment by a PG operator, a VAN operator, and/or a payment server connected to the operation server 300.

Figure 11:
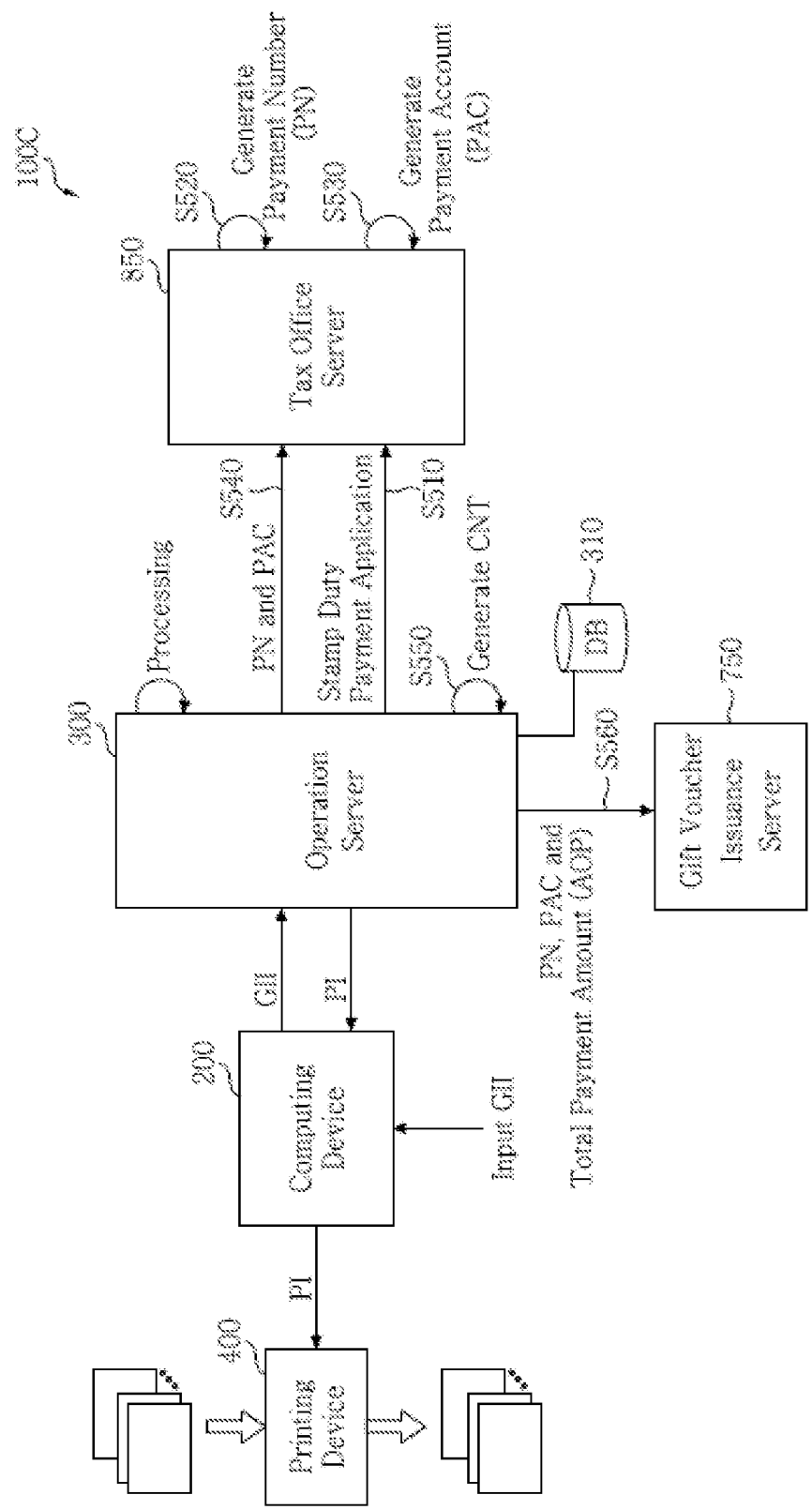
FIG. 11 is a schematic block diagram of a gift voucher issuing service system according to the embodiments of the present invention.

FIG. 11 is a schematic block diagram of the gift voucher issuing service system according to the embodiments of the present invention. Referring to FIG. 11, a gift voucher issuing (producing, ticketing, or printing) service system 100C can calculate a total stamp duty payment amount (for example, post payment). The gift voucher issuing service system 100C includes a computing device 200, an operation server 300, and a printing apparatus 400, and may further include a gift voucher issuer server 750 and a tax office server 850.

The components 200, 300, and 400 of FIG. 11 may process steps for implementing the method of providing a gift voucher issuing service described with reference to FIGS. 1 to 6 or the method of providing a gift voucher issuing service described with reference to FIGS. 7 to 10.

The operation server 300 may create (or generate) a stamp duty payment application and transmit the stamp duty payment application to the tax office server 850 through a communication network (S510).

The tax office server 850 may generate a stamp duty payment number PN based on the stamp duty payment application (S520) and generate a stamp duty payment account PAC (S530).

The tax office server 850 may transmit the stamp duty payment number PN and the stamp duty payment account PAC to the operation server 300 (S540).

The operation server 300 counts the number of issued gift vouchers that are issued and registered (S188 or S375) for each face value and generates a count value CNT for the each face value (S550). When it is assumed that two 100,000 won gift vouchers are issued and registered (CNT1=2), five 50,000 won gift vouchers are issued and registered (CNT2=5), a stamp duty of a 100,000 won gift voucher is TAX_1, and a stamp duty of a 50,000 won gift voucher is TAX_2, the total stamp duty payment amount AOP is TAX_1*CNT1+TAX_2*CNT2.

For example, when an operator of the operation server 300 and an operator of the gift voucher issuer server 750 are different from each other, the operation server 300 transmits the stamp duty payment number PN, the stamp duty payment account PAC, and the total stamp duty payment amount AOP to the gift voucher issuer server 750 through a communication network (S560).

However, when the operator of the operation server 300 and the operator of the gift voucher issuer server 750 are the same as each other, the operation server 300 does not perform step S560.

FIG. 12 shows a cross-sectional structure of a gift voucher sheet used by the printing apparatus shown in FIGS. 1 and 7.

A gift voucher sheet GC1 or GC1' cut in an I-I direction in FIG. 5 or 9 includes components 901 to 909 as a gift voucher sheet (for example, a thermal sheet) manufactured according to an exemplary embodiment of the present invention. Referring to FIGS. 5, 9, and 12, the Mint printing apparatus prints beforehand printing information in the beforehand printing area of each of gift voucher sheets and packages gift voucher printing sheets in a roll shape. The printing apparatus 400 prints afterward printing information in the afterward printing area of each of the gift voucher sheets and issues a gift voucher GC1A or GC1B.

Invisible fluorescence colored threads 901 and 905 or invisible fluorescence pigments 901 and 905 are deposited on front and back sides of gift voucher printing stencil paper 903. A water mark may be applied to the gift voucher printing stencil paper 903.

The invisible fluorescence colored threads (or pigments) 901 and 905 are not visually identified and are only visible at specific wavelengths as special fibers (or special pigments) that can be introduced into the gift voucher printing stencil paper 903. For example, the invisible fluorescence colored threads 901 and 905 may be green or blue, and fluorescent intrinsic colors (for example, green or blue) appear when ultraviolet fluorescent lamp illuminates them.

Thermal developed color dye 907 is applied on or above the invisible fluorescence colored threads 905. For example, the thermal developed color dye 907 form a color developing layer, and the color developing layer includes a colorless dye and a developer for displaying colors, and the colorless dye and the developer are melted together to develop a black color when heat is applied to the color developing layer. Parts whose colors are developed to the black color are symbols, figures, letters, numbers, or pictures. A coating preservative dye 909 is applied on or above the thermal developed color dye 907 and functions as a protective film that protects the thermal developed color dye 907.

The printing apparatus 400, which uses the thermal printing or direct thermal printing method or the thermal transfer printing method, prints afterward printing information in the afterward printing area by applying heat to a specific portion of the gift voucher sheet GC1 or GC1'.

Figure 13:
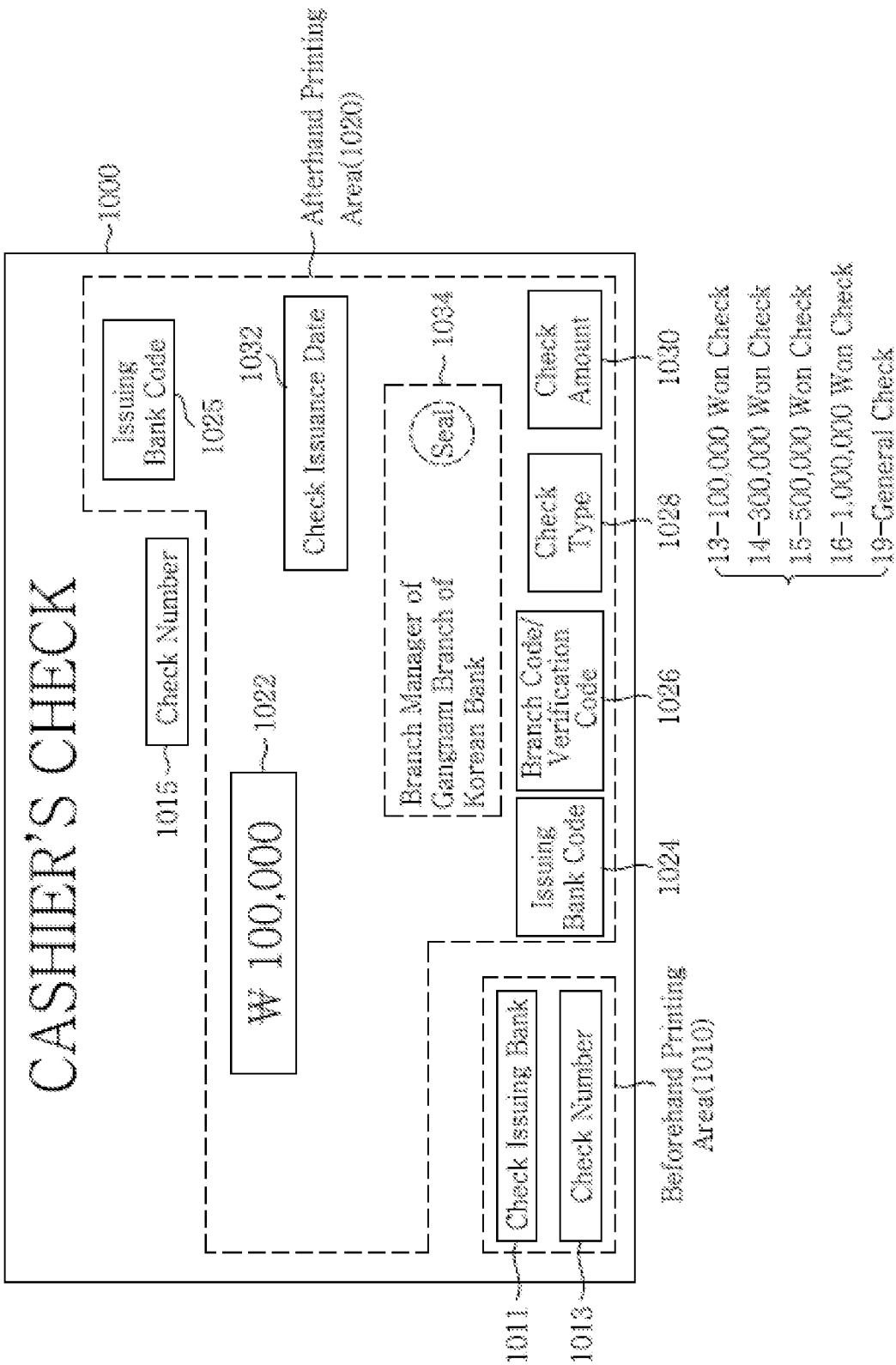
FIG. 13 is an embodiment of marketable security including beforehand printing information printed in a beforehand printing area and afterward printing information printed in an afterward printing area according to an embodiment of the present invention.

FIG. 13 is an embodiment of marketable securities including beforehand printing information printed in a beforehand printing area and afterward printing information printed in an after-hand printing area according to an exemplary embodiment of the present invention.

FIG. 13 shows a cashier's check 1000 among marketable securities, and the cashier's check 1000 includes a beforehand printing area (or pre-printing area) 1010 in which beforehand printing information (or pre-printing information) is printed and an afterward printing area (or post-printing area) 1020 in which afterward printing information (or post-printing information) is printed.

The beforehand printing information (or invariable printing information) is information printed by the Mint printing apparatus and includes a check issuing bank 1011 and at least one check number 1013 and/or 1015. The check issuing bank 1011 represents the name of a bank that has issued a check, and the check number 1013 and/or 1015 are unique numbers. A check number 1015 may include letters and the check number 1013.

The afterward printing information (or variable printing information) is information printed by the printing apparatus 400 and includes a check amount 1022, an issuing bank code 1024, a branch code (or verification code) 1026, a check type 1028, a check amount 1030, a check issuance date 1032, and issuing bank manager information 1034. According to the exemplary embodiments, the afterward printing information can be changed.

The issuing bank code 1024 is information representing at which bank or branch a check is actually issued and may include numbers.

The branch code (or verification code) 1026 represents a check account number or an account serial number. The check type 1028 includes numbers corresponding to the type of an issued check. For example, when a number for the check type 1028 is 13, 13 represents that the issued check is a 100,000 won check. When a number for the check type 1028 is 19, 19 represents that the issued check is a general check (that is, other than a 100,000 won check, a 300,000 won check, a 500,000 won check, and a 1,000,000 won check).

Each check amount 1022 or 1030 represents a face value of an issued check.

The issuing bank manager information 1034 represents information on a manager of an issuing bank that has issued the cashier's check 1000.

In the afterward printing area 1020, the issuing bank code 1025 may be further printed.

Conventionally, when a cashier's check is issued, the issuing bank code 1025, the check issuance date 1032, and the issuing bank manager information 1034 were stamped directly by an employee of a bank with a seal, a stamp, and/or a nameplate coated with inkpad. However, the printing apparatus 400 instead of the employee of a bank prints the issuing bank code 1025, the check issuance date 1032, and the issuing bank manager information 1034 in an embodiment of the present invention.

Figure 14:
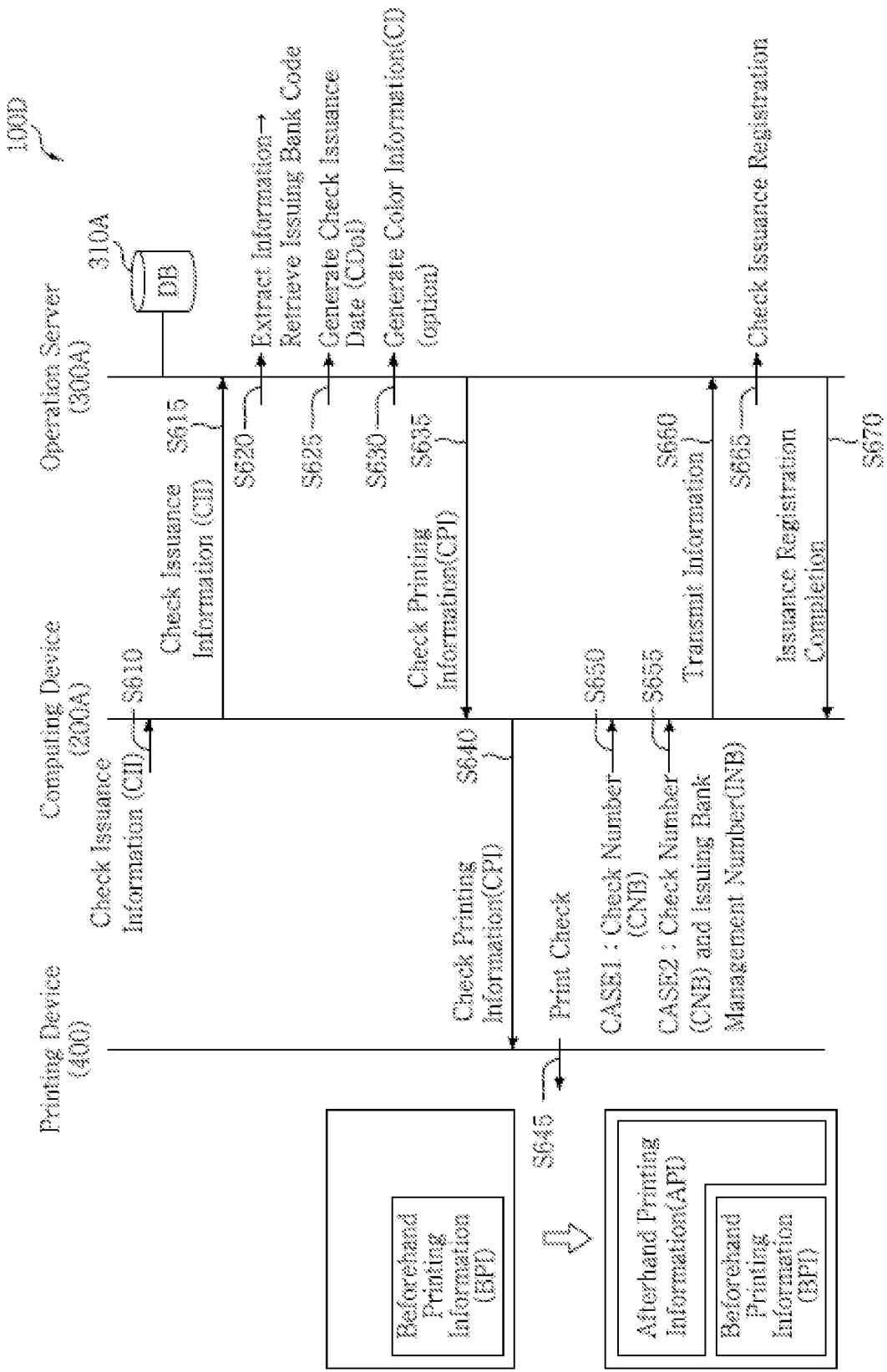
FIG. 14 is a schematic block diagram of a check issuing service system according to embodiments of the present invention.

FIG. 14 is a schematic block diagram of a check issuing service system according to the embodiments of the present invention, and FIG. 15 is an embodiment of information of a third table stored in a database shown in FIG. 14.

Referring to FIGS. 13 to 15, a check issuing (producing, ticketing, or printing) service system 100D includes a computing device 200A, an operation server 300A, and the printing apparatus 400. The operation server 300A may store information or retrieve information from the database 310A by accessing database 310A that stores a third table TABLE3.

The database 310A is an information storage device that stores information, and may be included inside the check issuing service system 100D or may be disposed outside the check issuing service system 100D. For example, an operator of the database 310A and an operator of the check issuing service system 100D may be the same as or different from each other.

When check (for example, a cashier's check) issuance information CII is input to the computing device 200A (S610), the computing device 200A may transmit a check issuance request including the check issuance information CII to the operation server 300A through a communication network (S615). The check issuance request may include the check issuance information CII, a uniform resource locator URL of the operation server 300A, and an identifier (for example, an IP address) of the computing device 200A. For example, the check issuance information CII may include each face value VAL and the number of issuances for each face value VAL.

The operation server 300A may extract information (for example, the identifier of the computing device 200A from the check issuance request, retrieve an issuing bank management number INB corresponding to the extracted identifier from the database 310A, and store the issuing bank management number INB in the third table TABLE3 (S620). For example, as shown in FIG. 15, it is assumed that the issuing bank management number INB matching the identifier of the computing device 200A is IM1. For example, the issuing bank management number INB may include at least one of the issuing bank code 1024 and the branch code (or verification code) 1026.

The operation server 300A generates a reception date of the check issuance request as a check issuance date CDoI, and stores it in the third table TABLE3 (S625). When color information CI for each face value VAL is stored in the database 310A in advance, the operation server 300A may selectively retrieve color information CI corresponding to a face value VAL from the database 310A, and store the color information CI in the third table TABLE3 (S630).

The operation server 300A may generate check printing information (CPI) and transmit the check printing information CPI to the computing device 200A through a communication network (S635). For example, the check printing information CPI may include an issuing bank management number INB, a face value VAL, and an issuance date CDoI.

The computing device 200A transmits the check issuance information CII to the printing apparatus 400 (S640). The printing apparatus 400 prints the check printing information CPI in the afterward printing area 1020 and issues an invalid check (S645).

For example, when the check issuance information CII is information for issuance of two 100,000 won checks, the check printing information CPI may include an issuing bank management number INB, a face value VAL corresponding to a check amount (for example, 100,000), information on the number of checks (for example, two checks), a check type (for example, 13), an issuance date CDoI, and issuing bank manager information 1034. For example, a check type for each face value VAL and issuing bank manager information corresponding to the identifier of the computing device 200A may be stored in the database 310A in advance.

The printing apparatus 400 may print afterward printing information (for example, variable printing information; API) on a first check sheet on which beforehand printing information (or invariable printing information; BPI) is printed. The beforehand printing information BPI includes a check issuing bank 1011 and a check number 1013 and/or 1015, and the afterward printing information API includes check printing information CPI.

At this time, the printing apparatus 400 prints the issuing bank management number INB as the issuing bank code 1024 and the branch code (or verification code; 1026), prints the face value VAL as the check amounts 1022 and 1030, prints a number 13 representing a 100,000 won check as the check type 1028, prints the issuance date CDoI as the check issuance date 1032, prints the issuing bank manager information 1034, and outputs a first invalid check.

Continuously, the printing apparatus 400 may print the afterward printing information API on a second check sheet on which the beforehand printing information BPI is printed. The beforehand printing information BPI includes a check issuing bank 1011 and a check number 1013 and/or 1015, and the afterward printing information API includes check printing information CPI. A check number printed on the first check sheet and a check number printed on the second check sheet are different from each other.

At this time, the printing apparatus 400 prints the issuing bank management number INB as the issuing bank code 1024 and the branch code (or verification code; 1026), prints the face value VAL as the check amounts 1022 and 1030, prints the number 13 representing a 100,000 won check as the check type 1028, prints the issuance date CDoI as the check issuance date 1032, prints the issuing bank manager information 1034, and outputs a second invalid check.

According to the embodiments, the printing apparatus 400 additionally prints an issuing bank code in the afterward printing area of the first check sheet, and additionally prints an issuing bank code in the afterward printing area of the second check sheet.

As described with reference to FIG. 5, the first check sheet and the second check sheet may be wound in a roll shape, and a cutting mark may be printed between the first check sheet and the second check sheet. It is assumed that a structure of the printing apparatus 400 that prints a check is the same as or similar to that of the printing apparatus 400 that prints a gift voucher. Before check issuance registration (S665) is completed, the first check and the second check are invalid checks.

Referring to the case 1 CASE1 of FIG. 14, when a first check number (CNB=CNB1) printed on the first check is input to the computing device 200A through an input device (S650), the computing device 200A generates a check issuance registration request including the first check number (CNB=CNB1) and the identifier of the computing device 200A, and transmits the check issuance registration request to the operation server 300A through a communication network (S660).

According to an embodiment, the operation server 300A may identify the computing device 200A using the identifier of the computing device 200A, and store the first check number (CNB=CNB1) transmitted from the computing device 200A in the third table TABLE3 for check issuance registration (S665). According to another embodiment, the operation server 300A may change the bit value of the flag instructing the check issuance registration from a first value to a second value (S665). When the check issuance registration of the first check is completed as the first check number (CNB=CNB1) is stored in the third table TABLE3 or the bit value of the flag is changed to the second value (S665), a first invalid check is finally converted into a first valid check.

Since a process of converting a second invalid check into a second valid check using a second check number (CNB=CNB2) printed on the second check is the same as or similar to a process of converting a first invalid check into a first valid check using the first check number (CNB=CNB1) printed on the first check, description thereof will be omitted.

Referring to the case 2 CASE2 of FIG. 14, the first check number (CNB=CNB1) and the first issuing bank management number (INB=IM1) printed on the first check are input to the computing device 200A through an input device (S655), the computing device 200A generates a check issuance registration request including the first check number (CNB=CNB1), the first issuing bank management number (INB=IM1), and the identifier of the computing device 200A, and transmits the check issuance registration request to the operation server 300A through a communication network (S660).

According to an embodiment, the operation server 300A may identify the computing device 200A using the identifier of the computing device 200A, and store the first check number (CNB=CNB1) transmitted along with the first issuing bank management number (INB=IM1) in the third table TABLE3 for check issuance registration (S665). According to another embodiment, the operation server 300A may change the bit value of the flag instructing check issuance registration to the second value after the first check number (CNB=CNB1) is stored in the third table TABLE3 (S665). When the check issuance registration of the first check is completed as the first check number (CNB=CNB1) is stored in the third table TABLE3 or as the bit value of the flag is changed (S665), a first invalid check is finally converted into a first valid check.

The process of converting a second invalid check into a second valid check using the second check number (CNB=CNB2) and the first issuing bank management number (INB=IM1) printed on the second check is the same as or similar to the process of converting a first invalid check into a first valid check using the first check number (CNB=CNB1) and the first issuing bank management number (INB=IM1) printed on the first check, description thereof will be omitted.

When the check issuance registration is completed (S665), the operation server 300A may transmit a message indicating that the issuance registration is completed to the computing device 200A through a communication network.

A computer program, which is coupled with hardware (for example, an operation server or a processor included in the operation server), is stored in a medium (for example, a database or a data storage device which can be accessed by the operation server or the processor) for issuing marketable securities (gift vouchers or cashier's checks), issuing mobile gift vouchers, and information confirmation/proceeding with a payment service, and is executable by the hardware, may perform the steps described with reference to FIGS. 1 to 6, the steps described with reference to FIGS. 7 to 12, or the steps described with reference to FIGS. 13 to 15.

Although the present invention has been described with reference to the exemplary embodiments shown in the drawings, it is merely exemplary, and it will be understood by those skilled in the art that various modifications and equivalent other embodiments may be made. Therefore, the true technical protection scope of the present invention will be defined by the technical spirit of the appended claims.

INDUSTRIAL APPLICABILITY

The present invention can be applied to a gift voucher issuing service system and a method of providing a gift voucher issuing service using the same.

What is claimed is:

1. A method of providing a gift voucher issuing service comprising:
   receiving, by an operation server, gift voucher issuance information from a computing device;
   generating, by the operation server, a reception date of the gift voucher issuance information as a gift voucher issuance date;
   generating, by the operation server, a use registration number on the basis of the gift voucher issuance information;
   generating, by the operation server, gift voucher printing information including the gift voucher issuance information, the gift voucher issuance date, and the use registration number, and transmitting the gift voucher printing information to the computing device;
   receiving, by a printing apparatus, the gift voucher printing information from the computing device, and ticketing an invalid gift voucher by printing the gift voucher issuance information, the gift voucher issuance date, and the use registration number on a gift voucher sheet on which a printing paper management number for managing a gift voucher sheet is printed in advance;

transmitting, by the computing device, the printing paper management number and the use registration number to the operation server; and converting the invalid gift voucher into a valid gift voucher as the operation server registers the printing paper management number and the use registration number as a pair.

2. The method of claim 1, further comprising:

generating further, by the operation server, stamp duty information on the basis of the gift voucher issuance information, and transmitting the gift voucher printing information further including the stamp duty information to the computing device; and receiving, by the printing apparatus, the gift voucher printing information further including the stamp duty information from the computing device, and ticketing the invalid gift voucher by printing the gift voucher issuance information, the gift voucher issuance date, the use registration number, and a stamp duty mark corresponding to the stamp duty information on the gift voucher sheet.

3. The method of claim 1, further comprising:

generating further, by the operation server, color information on the basis of the gift voucher issuance information, and transmitting the gift voucher printing information further including the color information to the computing device; and receiving, by the printing apparatus, the gift voucher printing information further including the color information from the computing device, and ticketing the invalid gift voucher by printing at least one of the gift voucher issuance information, the gift voucher issuance date, and the use registration number on the gift voucher sheet in a color corresponding to the color information.

4. The method of claim 1, wherein the printing apparatus prints the gift voucher issuance information, the gift voucher issuance date, and the use registration number on the gift voucher sheet using a thermal printing method.

5. The method of claim 1, further comprising:

after the invalid gift voucher is converted into the valid gift voucher, receiving, by the operation server, a mobile gift voucher transmission request including the printing paper management number and an ID of a second mobile device from a first mobile device;

generating, by the operation server, a payment authentication number in response to the mobile gift voucher transmission request; and generating, by the operation server, a mobile gift voucher including the payment authentication number, the gift voucher issuance information, and the gift voucher issuance date, and transmitting the generated mobile gift voucher to the second mobile device corresponding to the ID of the second mobile device, wherein at least one of the printing paper management number and the use registration number is invalidated after the payment authentication number is generated.

6. The method of claim 1, further comprising:

after the invalid gift voucher is converted into the valid gift voucher, receiving, by the operation server, a mobile gift voucher transmission request including the printing paper management number, the use registration number, and an ID of a second mobile device from a first mobile device;

generating, by the operation server, a payment authentication number in response to the mobile gift voucher transmission request; and generating, by the operation server, a mobile gift voucher including the payment authentication number, the gift voucher issuance information, and the gift voucher issuance date, and transmitting the mobile gift voucher to the second mobile device corresponding to the ID of the second mobile device, wherein at least one of the printing paper management number and the use registration number is invalidated after the payment authentication number is generated.

7. The method of claim 1, further comprising:

after the invalid gift voucher is converted into the valid gift voucher, receiving, by the operation server, a payment request including the printing paper management number and a payment amount from a store PC; and confirming, by the operation server, validity of the printing paper management number according to the payment request and proceeding with a payment service for the payment amount after the validity is confirmed.

8. The method of claim 1, after the invalid gift voucher is converted into the valid gift voucher, receiving, by the operation server, a payment request including the printing paper management number, the use registration number, and a payment amount from a store PC; and confirming, by the operation server, the validity of the printing paper management number and the use registration number according to the payment request and proceeding with a payment service for the payment amount after the validity is confirmed.

9. A method of providing a gift voucher issuing service comprising:

transmitting, by an operation server, a printing paper management number and a payment authentication number to a server;

receiving, by the operation server, gift voucher issuance information from a computing device;

generating, by the operation server, a reception date of the gift voucher issuance information as a gift voucher issuance date;

generating, by the operation server, a use registration number on the basis of the gift voucher issuance information;

generating, by the operation server, gift voucher printing information including the gift voucher issuance information, the gift voucher issuance date, and the use registration number, and transmitting the gift voucher printing information to the computing device;

receiving, by a printing apparatus, the gift voucher printing information transmitted from the computing device, and ticketing an invalid gift voucher by printing the gift voucher issuance information, the gift voucher issuance date, and the use registration number on a gift voucher sheet on which the payment authentication number and the printing paper management number for managing the gift voucher sheet are printed in advance;

transmitting, by the computing device, the printing paper management number and the use registration number to the operation server; and converting the invalid gift voucher into a valid gift voucher as the operation server registers the printing paper management number and the use registration number as a pair, wherein the payment authentication number printed on the gift voucher sheet in advance is coated with an opaque material not to be visible.

10. The method of claim 9, further comprising:

generating further, by the operation server, stamp duty information on the basis of the gift voucher issuance information, and transmitting the gift voucher printing information further including the stamp duty information to the computing device; and receiving, by the printing apparatus, the gift voucher printing information further including the stamp duty information from the computing device, and ticketing the invalid gift voucher by printing the gift voucher issuance information, the gift voucher issuance date, the use registration number, and a stamp duty mark corresponding to the stamp duty information on the gift voucher sheet.

11. The method of claim 9, further comprising:

generating further, by the operation server, color information on the basis of the gift voucher issuance information, and transmitting the gift voucher printing information further including the color information to the computing device; and receiving, by the printing apparatus, the gift voucher printing information further including the color information from the computing device, and ticketing the invalid gift voucher by printing at least one of the gift voucher issuance information, the gift voucher issuance date, and the use registration number on the gift voucher sheet in a color corresponding to the color information.

12. The method of claim 9, further comprising:

after the invalid gift voucher is converted into the valid gift voucher, receiving, by the operation server, a mobile gift voucher transmission request including the payment authentication number and an ID of a second mobile device from a first mobile device;

generating, by the operation server, a new payment authentication number in response to the mobile gift voucher transmission request; and generating, by the operation server, a mobile gift voucher including the new payment authentication number, the gift voucher issuance information, and the gift voucher issuance date, and transmitting the mobile gift voucher to the second mobile device corresponding to the ID of the second mobile device, wherein the payment authentication number is invalidated after the new payment authentication number is generated.

13. The method of claim 9, further comprising:

receiving, by the operation server, a mobile gift voucher transmission request including the printing paper management number, the payment authentication number, and an ID of a second mobile device from a first mobile device;

generating, by the operation server, a new payment authentication number in response to the mobile gift voucher transmission request; and generating, by the operation server, a mobile gift voucher including the new payment authentication number, the gift voucher issuance information, and the gift voucher issuance date, and transmitting the mobile gift voucher to the second mobile device corresponding to the ID of the second mobile device, wherein the payment authentication number is invalidated after the new payment authentication number is generated.

14. The method of claim 9, further comprising:

receiving, by the operation server, the payment authentication number and a payment amount from a store PC; and confirming, by the operation server, validity of the payment authentication number, and proceeding with a payment service for the payment amount after the validity is confirmed.

15. The method of claim 9, further comprising:

receiving, by the operation server, the printing paper management number, the payment authentication number, and a payment amount from a store PC; and confirming, by the operation server, the validity of the printing paper management number and the payment authentication number, and proceeding with a payment service for the payment amount after the validity is confirmed.

16. The method of claim 9, wherein the gift voucher issuance information includes a gift voucher issuer, a face value, and the number of issuances of the face value.

17. A gift voucher issuing service system comprising:

a printing apparatus;

a computing device configured to control an operation of the printing apparatus; and an operation server configured to transmit or receive information to or from the computing device through a communication network, wherein the operation server transmits a first printing paper management number, a second printing paper management number, a first payment authentication number, and a second payment authentication number to a server, receives gift voucher issuance information from a computing device, generates a reception date of the gift voucher issuance information as a gift voucher issuance date, generates a first use registration number and a second use registration number on the basis of the gift voucher issuance information, generates gift voucher printing information including the gift voucher issuance information, the gift voucher issuance date, the first use registration number, and the second use registration number, and transmits the gift voucher printing information to the computing device, the printing apparatus receives the gift voucher printing information transmitted from the computing device, tickets a first invalid gift voucher by printing the gift voucher issuance information, the gift voucher issuance date, and the first use registration number on a first gift voucher sheet on which the first printing paper management number for managing the first gift voucher sheet and the first payment authentication number are printed in advance, and subsequently tickets a second invalid gift voucher by printing the gift voucher issuance information, the gift voucher issuance date, and the second use registration number on a second gift voucher sheet on which the second printing paper management number for managing the second gift voucher sheet and the second payment authentication number are printed in advance, the computing device transmits the second printing paper management number and the second use registration number to the operation server after transmitting the first printing paper management number and the first use registration number to the operation server, the first invalid gift voucher is converted into a first valid gift voucher as the operation server registers the first printing paper management number and the first use registration number as a pair, and the second invalid gift voucher is converted into a second valid gift voucher as the operation server registers the second printing paper management number and the second use registration number as a pair, each of the first payment authentication number printed on the first gift voucher sheet in advance and the second payment authentication number printed on the second gift voucher sheet in advance is coated with an opaque material not to be visible, and the printing apparatus, when the first gift voucher sheet and the second gift voucher sheet are connected, cuts between the first gift voucher sheet and the second gift voucher sheet using a cutter, and tickets each of the first invalid gift voucher and the second invalid gift voucher in sheets.

18. The gift voucher issuing service system of claim 17, wherein, when the gift voucher issuance information includes a first gift voucher issuer, a first face value, a second gift voucher issuer, and a second face value, the gift voucher issuance information printed on the first gift voucher sheet includes the first gift voucher issuer, the first face value, and a first stamp duty mark, the gift voucher issuance information printed on the second gift voucher sheet includes the second gift voucher issuer, the second face value, and a second stamp duty mark, and at least one of the first gift voucher issuer, the first face value, and the first stamp duty mark, and at least one of the second gift voucher issuer, the second face value, and the second stamp duty mark are different from each other.

* * * * *